(12) United States Patent
Morita et al.

(10) Patent No.: US 10,662,490 B2
(45) Date of Patent: May 26, 2020

(54) HARDENING APPARATUS FOR A LONG MEMBER, AND A HARDENING METHOD FOR A LONG MEMBER

(71) Applicant: SANGO CO., LTD., Miyoshi-shi, Aichi (JP)

(72) Inventors: Yoshinori Morita, Miyoshi (JP); Akira Murakami, Miyoshi (JP); Tomoyuki Takeda, Miyoshi (JP); Fumio Kaneda, Hamura (JP); Haruo Fukushima, Hamura (JP)

(73) Assignee: SANGO CO., LTD., Miyoshi-Shi, Aichi (JP)

( * ) Notice: Subject to any disclaimer, the term of this patent is extended or adjusted under 35 U.S.C. 154(b) by 306 days.

(21) Appl. No.: 15/579,008

(22) PCT Filed: May 19, 2016

(86) PCT No.: PCT/JP2016/064875
§ 371 (c)(1),
(2) Date: Dec. 1, 2017

(87) PCT Pub. No.: WO2016/194627
PCT Pub. Date: Dec. 8, 2016

(65) Prior Publication Data
US 2018/0142315 A1 May 24, 2018

(30) Foreign Application Priority Data

Jun. 1, 2015 (JP) .................................. 2015-111762
Feb. 24, 2016 (JP) .................................. 2016-048941

(51) Int. Cl.
*C21D 1/18* (2006.01)
*C21D 9/08* (2006.01)
(Continued)

(52) U.S. Cl.
CPC ................. *C21D 1/18* (2013.01); *C21D 1/62* (2013.01); *C21D 9/08* (2013.01); *C21D 9/085* (2013.01);
(Continued)

(58) Field of Classification Search
CPC ............... C21D 1/18; C21D 1/62; C21D 9/08
See application file for complete search history.

(56) References Cited

U.S. PATENT DOCUMENTS 4,147,335 A 4/1979 Heck
2004/0226632 A1 11/2004 Lecoester
(Continued)

FOREIGN PATENT DOCUMENTS

JP S 53-94209 A 8/1978
JP H 04-21716 A 1/1992
(Continued)

OTHER PUBLICATIONS

International Search Report (PCT/ISA/210) dated Aug. 23, 2016, by the Japan Patent Office as the International Searching Authority for International Application No. PCT/JP2016/064875.
(Continued)

*Primary Examiner* — Scott R Kastley
(74) *Attorney, Agent, or Firm* — Buchanan Ingersoll & Rooney PC

(57) ABSTRACT

A hardening apparatus comprises a tracing gauge that is a member having the same axis shape as the axis shape of a bent pipe and being held in an attitude identical to the bent pipe, and a tracing device that is a member which can move in the longitudinal direction of the bent pipe and the tracing gauge and can move in the direction perpendicular to the longitudinal direction. A guide part engaged with the tracing gauge in a manner slidable along the tracing gauge is held at one end of the tracing device, and a hardening device is
(Continued)

held at the other end. A transportation device moves the hardening device in the longitudinal direction by moving the tracing device.

9 Claims, 17 Drawing Sheets

(51) Int. Cl.
*C21D 11/00* (2006.01)
*C21D 1/62* (2006.01)
C21D 1/667 (2006.01)
B21D 53/88 (2006.01)
B23P 17/02 (2006.01)

(52) U.S. Cl.
CPC ............ *C21D 11/005* (2013.01); *B21D 53/88* (2013.01); *B23P 17/02* (2013.01); *C21D 1/667* (2013.01)

(56) References Cited

U.S. PATENT DOCUMENTS

| 2012/0079866 A1 | 4/2012 | Kuwayama et al. |
| 2018/0142315 A1* | 5/2018 | Morita ................ C21D 9/08 |

FOREIGN PATENT DOCUMENTS

| JP | H 07-34129 | 2/1995 |
| JP | H 07-124667 A | 5/1995 |
| JP | H 09-157753 A | 6/1997 |
| JP | H 10-208861 A | 8/1998 |
| JP | H 11-290956 A | 10/1999 |
| JP | 2000-256733 A | 9/2000 |
| JP | 2002-012915 A | 1/2002 |
| JP | 3408985 B2 | 5/2003 |
| JP | 2004-270025 A | 9/2004 |
| JP | 2011-000641 A | 1/2011 |
| JP | 2014-073516 A | 4/2014 |

OTHER PUBLICATIONS

Written Opinion (PCT/ISA/237) dated Aug. 23, 2016, by the Japan Patent Office as the International Searching Authority for International Application No. PCT/JP2016/064875.

* cited by examiner

FIG. 2
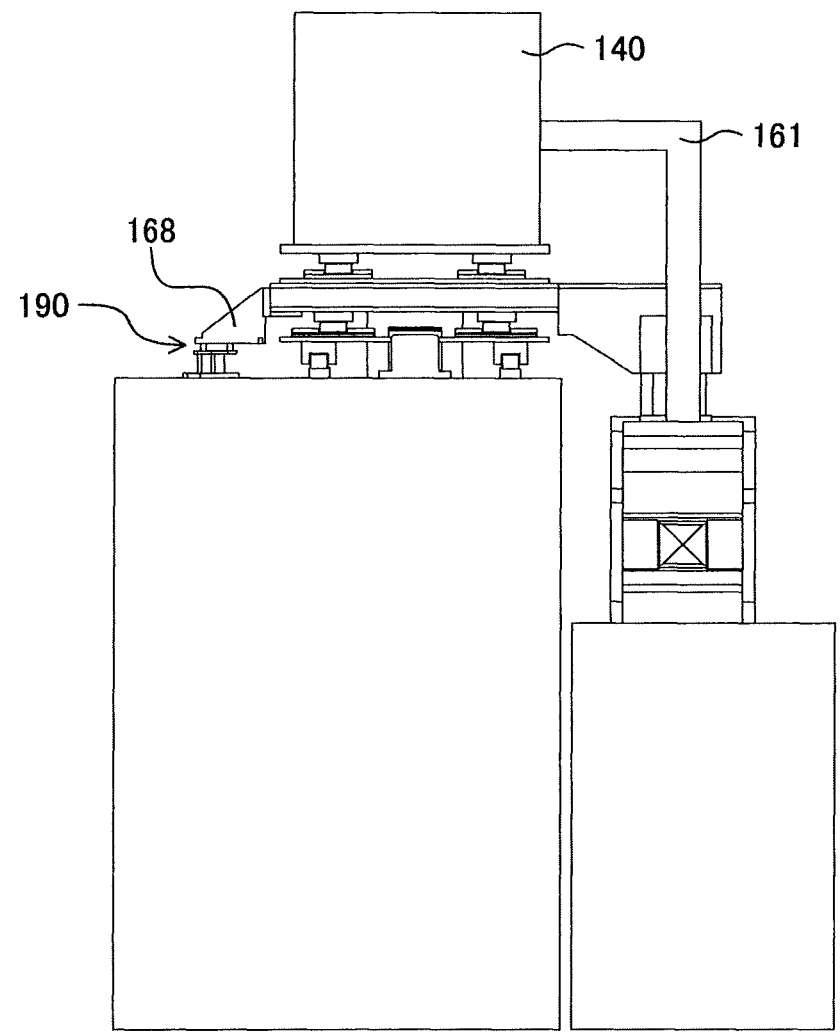
(a)
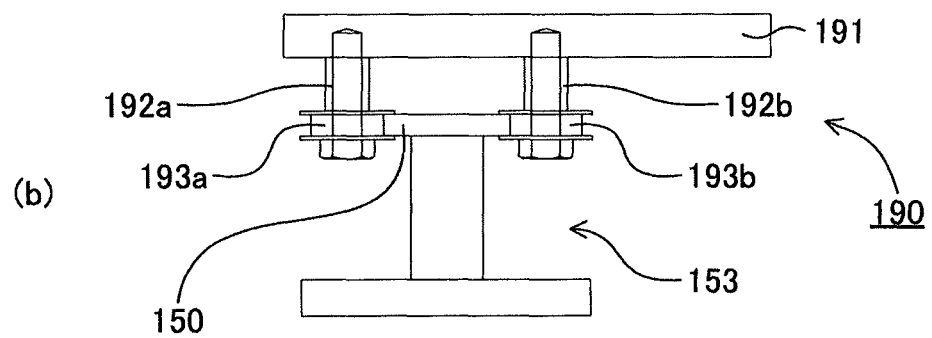
(b)

FIG. 12
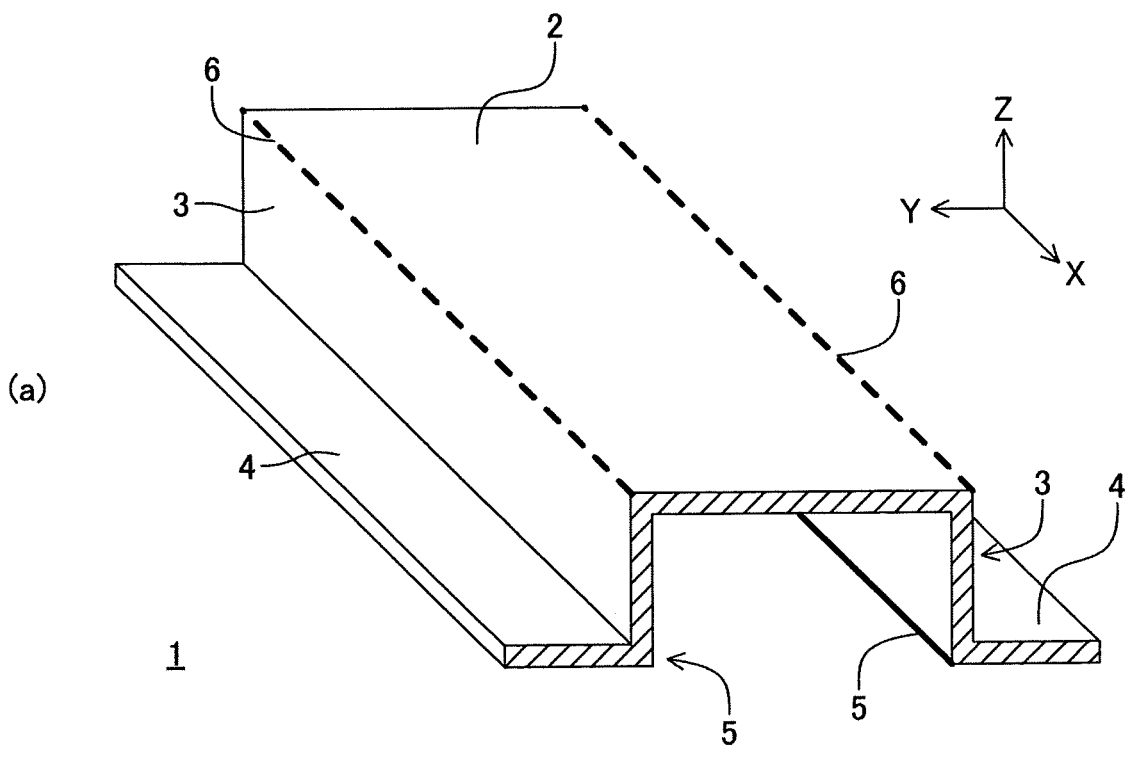
(a)
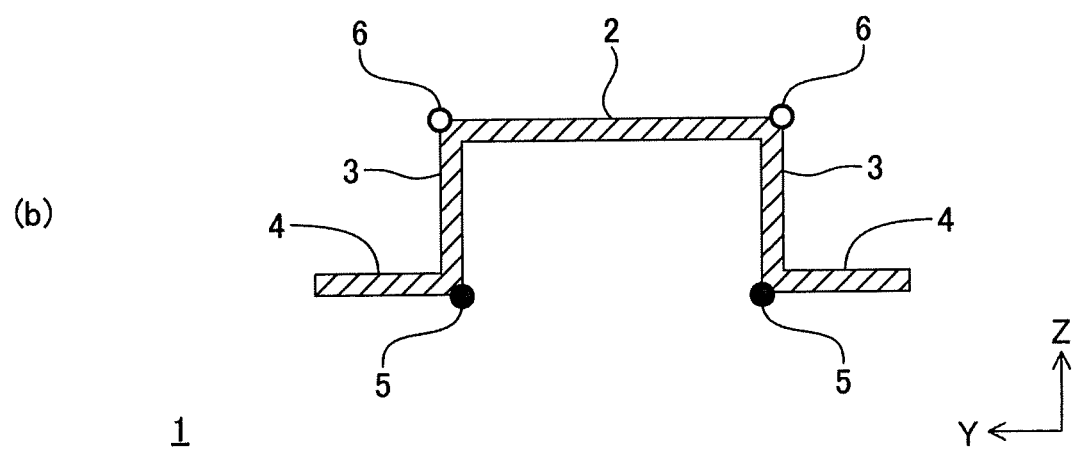
(b)

FIG. 15
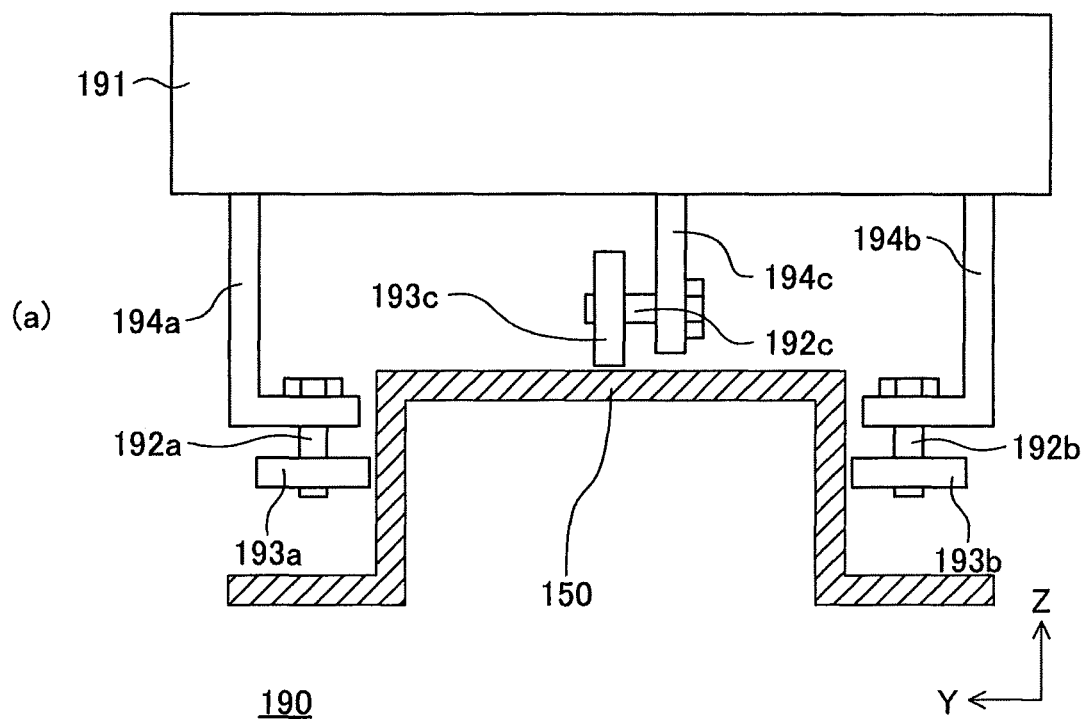
(a)
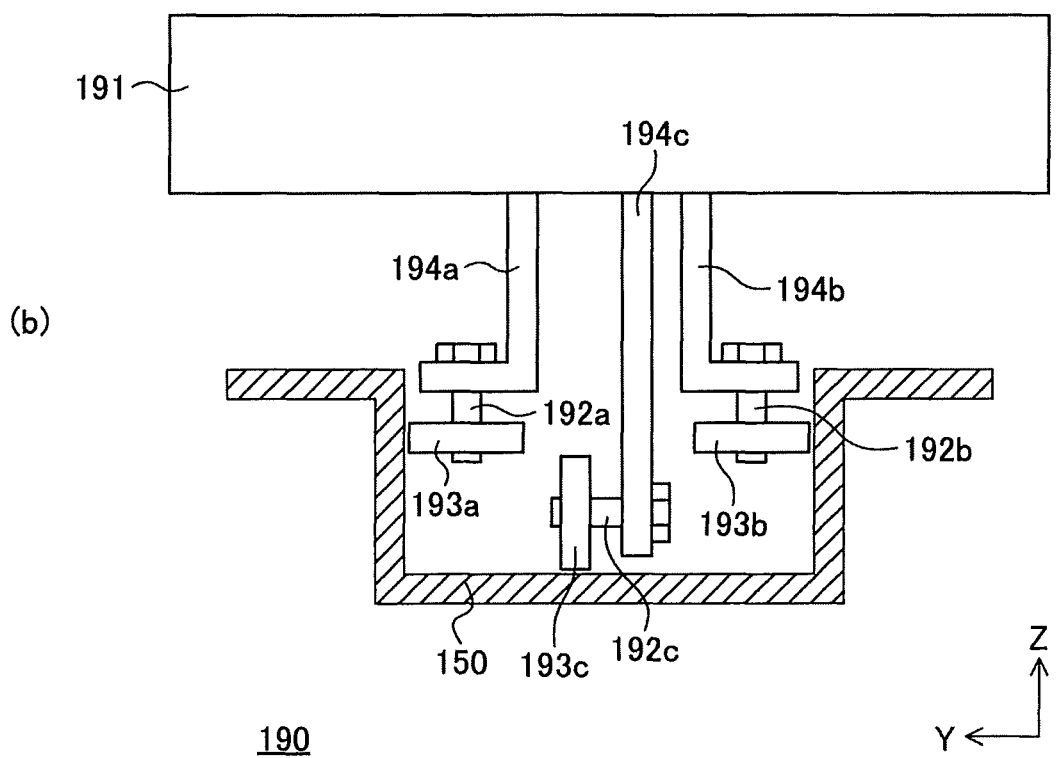
(b)

HARDENING APPARATUS FOR A LONG MEMBER, AND A HARDENING METHOD FOR A LONG MEMBER

TECHNICAL FIELD

The present invention relates to an apparatus for performing a hardening treatment on at least a part of a long member, such as a long member having a bent portion (for example, a steel pipe, etc.) and a long member having a modified cross-section (for example, a hat-like cross-section), for example. Furthermore, the present invention relates also to a hardening treatment method in which the hardening apparatus is used.

BACKGROUND ART

For example, what is called "hardening" aiming at raising mechanical strength etc. of a "tubular member having a bend portion" (which may be referred to as a "bent pipe" hereafter) used as a part for a vehicle, such as a door impact beam and an antiroll bar, has been known. A hardening treatment is a treatment in which a member as a treatment target is heated to a predetermined temperature or higher and thereafter cooled rapidly. The hardening treatment may be performed on the whole member as the treatment object, or it may be performed locally on a part of the member as the treatment object.

As a specific example of the former, for example, it has been known to rapidly cool a pipe subjected to bending beforehand (bent pipe) (by making the pipe contact with cooling water, etc.) after heating the whole pipe to a predetermined hardening temperature or higher. However, in accordance with this method, since a hardening treatment is performed to the whole bent pipe, this method cannot be applied when a hardening treatment is not performed on a part of a bent pipe, for example.

On the other hand, in the latter case, it is common to perform a hardening treatment on a part of a bent pipe by moving a hardening means including a heating means and a cooling means little by little along a longitudinal direction of a bent pipe to heat and cool a part of the pipe, which needs to be hardened. In this case, on the contrary to the above, the hardening means may be fixed and a bent pipe may be moved. Namely, any of a bent pipe and a hardening means may move, and they just have to move relatively.

In any case, while a bent pipe and a heating means are moving relatively, when a spatial relationship between the bent pipe and the heating means deviates (inclines) or, furthermore, when the bent pipe and the heating means interfere, there is a possibility that a hardening treatment of the bent pipe may become uneven, or the heating means may be damaged. Therefore, the spatial relationship between the bent pipe and the heating means needs to be controlled strictly.

As a specific example of such a hardening treatment, for example, an apparatus which cooperatively controls a plurality of industrial robots to simultaneously perform bending and a hardening treatment of a tubular member (which may be simply referred to as a "pipe" hereafter) has been known (for example, refer to the Patent Document 1 (PTL1)). This apparatus comprises a feed mechanism for a pipe, a first support mechanism to support the pipe while feeding the pipe, a heating mechanism, a cooling mechanism, a second support mechanism to give bending moment to a heated part of the pipe to bend the pipe, and a deformation preventing mechanism for a pipe.

In order to perform bending with sufficient precision in the above-mentioned apparatus to make a pipe into a desired shape, it is necessary to carry out the cooperative control of the operation of three mechanisms, i.e., the above-mentioned feed mechanism, second support mechanism, deformation preventing mechanism for a pipe, strictly. Therefore, when performing a "changeover" for changing a production brand, complicated operations, such as setting of many control items, confirmation and fine control of an operation becomes necessary for each of the above-mentioned mechanisms. Therefore, the above-mentioned apparatus is not suitable for multi-product production.

Furthermore, as mentioned above, since the above-mentioned apparatus needs a plurality of industrial robots and a controller for cooperatively controlling them, etc., it needs a great installation fee, a vast operation space, and large electric power consumption.

In addition, in the above-mentioned apparatus, since a pipe is bent by using softening of the pipe accompanying heating in a hardening treatment, a hardening treatment is certainly performed on a bent part of the pipe (which may be referred to as a "bend part" hereafter). Therefore, when hardening is not needed in the bend part of the pipe, the above-mentioned apparatus cannot be used.

On the other hand, in the art, a hardening apparatus which performs a hardening treatment on a pipe subjected to bending beforehand (bent pipe) has been also known (refer to the Patent Document 2 (PTL2)). This apparatus comprises an induction-heating coil, a multi-axis robot (articulated industrial robot) as a transportation means, which makes a pipe pass through the inside of the induction-heating coil, and a cooling means disposed on a downstream from the above-mentioned induction-heating coil.

In the above-mentioned apparatus, a bent pipe is held by a plurality of clamps attached at a leading end of an arm of the above-mentioned robot and the above-mentioned robot operates such that the bent pipe passes through an induction-heating coil approximately at a center of the coil. On this occasion, the bent pipe is moved in its longitudinal direction with respect to the induction-heating coil and the cooling means while opening and closing these multiple clamps one by one, and a hardening treatment is performed.

In accordance with the apparatus as mentioned above, since a hardening treatment can be performed regardless of a position of the bend part of the bent pipe, problems resulting from simultaneously performing bending and a hardening treatment like the conventional apparatus as previously mentioned can be solved.

However, in the above-mentioned apparatus, it is necessary to teach and adjust an operation of an industrial robot according to a shape of the bent pipe used as a target of a hardening treatment (workpiece). In addition, in the case of a changeover, it is necessary to change a layout of the above-mentioned multiple clamps according to a shape of a bent pipe. Therefore, also in the above-mentioned apparatus, a complicated operation is needed when performing a changeover.

By the way, as mentioned above, it is known that a long member which has a modified cross-section will be used in a structural member which constitutes a body of a vehicle. Specifically, for example, in a center pillar and a cross member, etc., of a vehicle, a long member having a hat-like cross-section, which is formed by press processing of a steel plate is used.

In addition, a "long member" means a member having a shape in which a size of the member in a specific direction is relatively longer as compared with a size of the member in another direction. The above-mentioned specific direction in the member is referred to as a "longitudinal direction", and the direction which intersects perpendicularly with the "longitudinal direction" is referred as to a "width direction" or "thickness direction."

As a method for raising mechanical strength of a long member as mentioned above, for example, a method in which the long member is combined with a reinforcement member having high mechanical strength has been known. However, addition of the reinforcement member may lead to problems, such as increase of weight of the member, increase of a manufacturing cost, and complication of a manufacturing process, for example.

Alternatively, a technology in which a long member having a hat-like cross-section is manufactured by what is called "hot-pressing" and thereby the entire of the long member is formed and hardened simultaneously has been also known. In accordance with the technology, the mechanical strength in all the regions of the long member having a hat-like cross-section can be raised and thereby collision security of a vehicle, etc., can be improved, for example. However, as compared with usual pressing (not accompanied by heating), hot-pressing requires a large-scale installation. As a result, for example, there is a possibility to cause problems, such as, not only increase of a manufacturing cost, but also increase of a cost accompanying a changeover.

Therefore, in the art, a technology which raises mechanical strength of a long member having a hat-like cross-section by performing a hardening treatment partially only on a region in the vicinity of a corner part (bending line (edge) part of a steel plate) of a hat-like cross-section (which may be simply referred to as a "corner part region" hereafter) has been known.

In the above-mentioned hardening treatment, a hardening means, which comprises a high-frequency heating coil as a heating means and a cooling jacket as a cooling means arranged on a downstream side of the heating means, is arranged so as to oppose (face) the above-mentioned corner part region. Then, a hardening treatment can be performed only on the corner part region by moving the hardening means and the long member relatively along the longitudinal direction of the long member (refer to the Patent Documents 3 (PTL3)).

However, in hardening methods for a long member having a hat-like cross-section according to conventional technologies including the above, an axis in the longitudinal direction of a workpiece after a hardening treatment may curve (warp). Specifically, the axis in the longitudinal direction may be distorted such that the workpiece becomes convex-like on the back side (namely, a side opposite to a top plate in the hat-like cross-section (which may be referred to as a "concave portion side" or "flange side").

CITATION LIST

Patent Literature

[PTL1] Japanese Patent Application Laid-Open (kokai) No. 2011-000641
[PTL2] Japanese Patent Application Laid-Open (kokai) No. 2004-270025
[PTL3] Japanese Patent No. 3408985

SUMMARY OF INVENTION

As mentioned above, in the art, there is a demand to a hardening apparatus for a bent pipe, which can strictly control a spatial relationship between a bent pipe and a heating means, can reduce work load accompanying a changeover, and can attain low cost and space-saving. Therefore, one objective of the present invention is to provide a hardening apparatus for a bent pipe, which can strictly control a spatial relationship between a bent pipe and a heating means, can reduce work load accompanying a changeover, and can attain low cost and space-saving.

As a result of wholeheartedly research in order to attain the above-mentioned objective, the inventor found out that the above-mentioned objective could be attained by holding a hardening means with the tracing means which can move along a shape of a tracing gauge having a shape substantially identical to the bent pipe as a workpiece.

In light of the above, a hardening apparatus for a bent pipe according to the present invention (which may be referred to as a "first present-invention apparatus" hereafter) is a hardening apparatus for a bent pipe, which comprises a hardening means, a transportation means, and a control means.

The hardening means comprises a heating means and a cooling means, and cools rapidly a bent pipe as a workpiece after heating the bent pipe and thereby changes a structure of material, which constitutes the bent pipe, and, for example, raises the mechanical strength of the material, etc. For example, when the material which constitutes the bent pipe is steel, after the heating means heats the bent pipe to temperature at which the metal structure of steel turns into an austenite structure (for example, not less than 900° C.) and thereafter the cooling means cools the bent pipe rapidly to change the metal structure of steel to a martensite structure. Thereby, hardness, an abrasion resistance property, tensile strength and fatigue strength, etc. of steel are improved.

Although the heating means is not limited particularly as long as it is possible to heat a bent pipe up to temperature required to produce a structure change of material as mentioned above, it typically comprises an induction-heating coil which heats a bent pipe consisting of metal by induction heating (for example, high-frequency heating coil, etc.). Although the cooling means is not limited particularly as long as it is possible to cool rapidly the bent pipe heated by the heating means at a rate required to produce structure change of material as mentioned above, it is typically a cooling jacket which spouts coolant to a bent pipe. As a specific example of the cooling jacket, for example, a shower-type cooling jacket which has a plurality of holes drilled in a surface opposing a bent pipe and cooling water is blown toward the bent pipe from the plurality of the holes can be mentioned.

In addition, it is desirable that the heating means and the cooling means uniformly heat and cool the whole circumference in a part of a bent pipe to be hardened. Therefore, typically, it is desirable that the heating means and the cooling means have a hollow shape through which a bent pipe can pass (for example, a shape of a doughnut, etc.). In this connection, it is important to keep a gap (clearance) between a bent pipe and a heating means and cooling means constant over the whole circumference also during the bent pipe and the hardening means are moving relatively. Therefore, it becomes necessary to strictly control a spatial relationship between a bent pipe and a heating means and cooling means.

A transportation means moves relatively the bent pipe as a workpiece and the above-mentioned hardening means. "To move relatively" means to change a spatial relationship between the bent pipe and the hardening means by moving either or both of the bent pipe and the hardening means.

Specifically, for example, in a state where the bent pipe was held in a predetermined position, the hardening means may be moved along a longitudinal direction of the bent pipe. In this case, for example, the hardening means may be constituted so as to be able to move along the longitudinal direction of the bent pipe by being connected with a "base disposed on a guide rail parallel to the longitudinal direction of the bent pipe so as to be engaged with the guide rail and configured to be able to move along the guide rail." Furthermore, this base can be moved by, rotating a ball screw engaged with a nut attached to the base with a drive unit, such as a servomotor, for example.

On the contrary, the bent pipe may be moved in a state where the hardening means is held in a predetermined position such that the bent pipe passes through a region in which heating and cooling are performed by the hardening means. In any case, as will be mentioned in detail later, it is necessary to configure the spatial relationship between the bent pipe and the hardening means to be able to move not only in a direction parallel to the longitudinal direction of the bent pipe, but also a direction perpendicular to the longitudinal direction of the bent pipe in the first present-invention apparatus.

When the bent pipe and the hardening means relatively moved by the transportation means attain a predetermined spatial relationship, the control means heats the bent pipe by the heating means, and cools the bent pipe by the cooling means thereafter. Thereby, a hardening treatment is performed on at least a part of the bent pipe. The above-mentioned "predetermined spatial relationship" refers to a state where a part of the bent pipe, which should be hardened, is in a position suitable for being hardened by the hardening means. It can be detected whether the bent pipe and the hardening means are in the predetermined spatial relationship by a sensor which detects a relative spatial relationship between the bent pipe and the hardening means (for example, positions of the bent pipe and/or the hardening means), for example. Alternatively, when relatively moving the bent pipe and the hardening means with a ball screw rotated by a servomotor as mentioned above, the relative spatial relationship between the bent pipe and the hardening means can also be detected based on a rotation number of the ball screw.

When the bent pipe and the hardening means are in the predetermined spatial relationship, the control means makes the heating means operate. For example, when using an induction-heating coil as the heating means, the control means turns on electricity to the induction-heating coil, when the bent pipe and the hardening means are in the predetermined spatial relationship. On the other hand, the cooling means is prepared adjoiningly on the rear side of the heating means in a direction of movement of the hardening means with respect to the bent pipe. Thereby, the cooling means can cool rapidly the bent pipe heated by the heating means as the bent pipe and the hardening means move relatively. In addition, when using a cooling jacket as the cooling means, coolant (for example, water) for cooling the bent pipe may be blown only in a period when the heating means is operating, or the coolant may be blown continuously during operation of the first present-invention apparatus.

In addition, the first present-invention apparatus further comprises a tracing gauge and a tracing means.

The tracing gauge is a member having an axis shape identical to an axis shape of the bent pipe. Namely, the tracing gauge has a shape approximately identical to that of the bent pipe. Typically, the tracing gauge is a member having a shape identical to that of the bent pipe. However, the tracing gauge does not need to necessarily have a shape completely identical to that of the bent pipe, as long as a shape traced by the guide part (which may be referred to as a "tracing member"), which will be mentioned later, corresponds to the shape of the bent pipe. For example, when a curve of the bent pipe is two-dimensional, it is enough that the shape of the tracing gauge and the shape of the bent pipe are identical in a two-dimensional plane corresponding to the curve. In this case, for example, the tracing gauge may be a tabular member corresponding to the cross-section of the bent pipe by the above-mentioned two-dimensional plane. For example, such a tracing gauge may be the bent pipe as a workpiece itself, or may be a member produced by cutting etc., separately from the bent pipe.

In addition, as mentioned above, since there is a possibility that the hardening treatment on the bent pipe may become uneven or the heating means may be damaged when the spatial relationship between the bent pipe and the heating means deviates or the bent pipe and the heating means interfere during the bent pipe and the heating means are moving relatively, the spatial relationship between the bent pipe and the heating means needs to be controlled strictly. Therefore, the tracing gauge needs to be held in an attitude identical to that of the bent pipe as a workpiece. A method for holding the tracing gauge and the bent pipe in an identical attitude is not limited in particular.

For example, in one production line in which the bent pipe is bent just before the hardening treatment by the first present-invention apparatus, when the bent pipe subjected to bending is taken out from a bending apparatus and is attached to the first present-invention apparatus by an industrial robot, the attitude of the bent pipe attached to the first present-invention apparatus by the above-mentioned industrial robot is always the same. Therefore, the tracing gauge can be held in the same attitude as the bent pipe as a workpiece by holding the tracing gauge in a same attitude as the above-mentioned attitude. On the other hand, for example, when attaching the bent pipe previously subjected to bending to the first present-invention apparatus by a manual operation, as compared with the case where an industrial robots are used as mentioned above, it is difficult to keep the bent pipe attached to the first present-invention apparatus always in the same attitude. In such a case, for example, what is necessary is just to form a concave part (for example, cutout and notch, etc.), into which a convex part prepared in a mechanism (for example, chuck) for holding the bent pipe in the first present-invention apparatus, at a part to be held (for example, an end) of the bent pipe. Thereby, the attitude of the bent pipe can be always made the same when attaching the bent pipe to the first present-invention apparatus.

The tracing means is a member to transmit the shape of the tracing gauge traced by a guide part, which will be mentioned later, to the hardening means. Thereby, the hardening means can move along the shape of the bent pipe by moving along the shape of the tracing gauge traced by the guide part. As a result, it can be avoided that the spatial relationship between the bent pipe and the heating means deviates or the bent pipe and the heating means interfere. Therefore, the tracing means is configured so as to be able to move relatively to the bent pipe and the tracing gauge, not only in the longitudinal direction of the bent pipe and the tracing gauge, but also in the direction perpendicular to the longitudinal direction.

Furthermore, the tracing means is configured so as to be moved relatively to the bent pipe by the transportation means. Specifically, for example, the tracing means moves relatively to the bent pipe in association with the transportation means moving the above-mentioned base, by being connected with the base. In this case, for example, the guide rail perpendicular to the longitudinal direction of the bent pipe is disposed on the base, and the tracing means is connected with a second base which is disposed so as to be engaged with the guide rail and is configured to be able to move along the guide rail. Thereby, the tracing means may be configured to be able to move relatively to the bent pipe and the tracing gauge, not only in the longitudinal direction of the bent pipe and the tracing gauge, but also in the horizontal direction perpendicular to the longitudinal direction. When the curve of the bent pipe is three-dimensional, the tracing means is connected with the second base through a mechanism which allows movement in the vertical direction, but does not allow movement in the horizontal direction (for example, a mechanism which consists of a pantograph collector and a slider). Thereby, since the tracing means can be configured to be able to move relatively to the bent pipe and the tracing gauge, not only in the longitudinal direction of the bent pipe and the tracing gauge, but also in the horizontal direction perpendicular to the longitudinal direction and in the vertical direction perpendicular to the longitudinal direction, the tracing means can be applied to a bent pipe having a three-dimensional curve.

A guide part engaged with the tracing gauge in a manner slidable along the tracing gauge is held at one end of the tracing means. The guide part is not limited in particular as long as it is possible to be engaged with the tracing gauge in a manner slidable along the tracing gauge. For example, the guide part comprises two or more guide rollers, and fits the tracing gauge with these guide rollers. Thereby, the guide part can trace the shape of the tracing gauge in association with the transportation means relatively moving the bent pipe and the tracing means.

On the other hand, the hardening means is held at the other end of the tracing means. Therefore, the shape of the tracing gauge traced by the guide part is transmitted to the hardening means through the tracing means. As a result, since the hardening means moves along the shape of the tracing gauge traced by the guide part, the hardening means can move along the shape of the bent pipe.

In accordance with the above, the guide part moves also in the direction perpendicular to the longitudinal direction of the bent pipe and the tracing gauge along the tracing gauge, and thereby the hardening means moves along the bent pipe with sufficient precision. Namely, in accordance with the first present-invention apparatus, it is possible to strictly control the spatial relationship between the bent pipe and the heating means by a simple mechanical means. Furthermore, a changeover can be easily performed by exchanging the tracing gauge with that corresponding to a new workpiece. In addition, since such a simple mechanical means is used, the first present-invention apparatus can attain low cost and space-saving simultaneously, as compared with a case where an industrial robot is used.

By the way, the control means performs a hardening treatment on at least a part of the bent pipe by controlling the hardening means to cool the bent pipe by the cooling means after heating the bent pipe by the heating means. Namely, the control means controls supply of electric power to the heating means and supply of coolant to the cooling means, etc., for example. Therefore, when the control means and the hardening means are located away from each other, for example, there is a possibility that supply paths of electricity and coolant may become longer, transfer loss of electricity and pressure loss of coolant, etc., may be caused, and these may become a factor which reduces energy efficiency of the first present-invention apparatus. Furthermore, for example, there is a possibility that wiring and piping for supplying electricity and coolant, etc. to the hardening means may become longer, space for disposing those wirings and piping may become necessary, and the first present-invention apparatus may be enlarged. In addition, when the hardening apparatus is moved by the transportation means, there is a possibility that a mechanism for routing the above-mentioned wiring and piping according to the movement of the hardening apparatus may become necessary and complication of the first present-invention apparatus may be caused.

Therefore, in the first present-invention apparatus, the control means may be configured so as to be held by the tracing means. In this case, the control means may constitute a part of the tracing means. Specifically, for example, the guide part and the hardening means may be held by an arm prepared in the control means, respectively. In this case, the control means and the arm constitute the tracing means.

Since the hardening means is held at one end of the tracing means according to the above, the control means can be disposed in the vicinity of the hardening means, and problems as mentioned above can be avoided, as a result.

By the way, since the control means controls supply of electric power to the heating means and supply of coolant to the cooling means, etc., for example, as mentioned above, the control means may comprise a transformer of electricity supplied to the heating means and a pump for supplying coolant to the cooling means, etc., for example. Therefore, a mass of the control means is generally large and it may become obstructive of smooth trace of the shape of the tracing gauge by the guide part. Since the tracing means needs to move also in the vertical direction especially when a curve of the bent pipe is three-dimensional, the influence of the large mass of a control means on the trace by the guide part is large. Therefore, it is desirable that the first present-invention apparatus comprises a mechanism which reduces a load applied to the tracing means due to the mass of the control means.

The above-mentioned mechanism is not limited in particular as long as it is possible to reduce the load applied to the tracing means due to the mass of the control means. However, in order to attain low cost and space-saving as the objective of the present invention, it is desirable to use a weight which balances with the weight of the control means, for example.

Therefore, when the control means is held by the tracing means as mentioned above, the first present-invention apparatus can further comprises a weight which is connected with the control means and arranged so as to at least partially balance with the weight of the control means.

In the above, a specific mechanism for reducing the load applied to the tracing means due to the mass of the control means is not limited in particular. For example, the above-mentioned weight is connected with the control means with a wire tied to the control means (or a base, on which the control means is laid, etc.) through a pulley laid on a base disposed on an upper part of the first present-invention apparatus, and is hung. Thereby, the above-mentioned weight can at least partially offset the load applied to the tracing means due to the weight of the control means. As a matter of course, in order to attain smooth trace of the shape of the tracing gauge by the guide part, it is desirable that a mass of the above-mentioned weight and the mass of the control means are equal.

In addition, since the control means moves in the longitudinal direction of the bent pipe and the tracing gauge and a direction perpendicular to the longitudinal direction as mentioned above, it is desirable that the above-mentioned weight is arranged so as to be able to apply, to the control means, force upward in the vertical direction, while following the movement of the control means. Therefore, a guide rail parallel to the moving direction of the control means (namely, the longitudinal direction of the bent pipe and the tracing gauge) is prepared on the upper part of the first present-invention apparatus, and a truck which can move along the guide rail is engaged with the guide rail and is disposed. Furthermore, a guide rail perpendicular to the moving direction of the control means is prepared on the truck, and another truck which can move along this guide rail is engaged with the guide rail and is disposed. By laying the above-mentioned pulley on this "another truck", force upward in the vertical direction can be kept applying to the control means even when the control means moves. In this case, it is desirable to hang the above-mentioned weight lateral to the moving direction of the control means. Thereby, the control means, the base, on which the pulley is laid, and the weight can move in the longitudinal direction of the bent pipe and the tracing gauge.

By the way, as mentioned above, in the hardening treatment, the bent pipe is heated up to temperature required for the heating means to produce a structure change of the material constituting the bent pipe. Therefore, depending on the configuration (for example, constitutional material and structure, etc.) of the bent pipe, the bent pipe may be deformed by its own weight at the time of heating. In order to prevent such deformation, it is more desirable the bent pipe is supported at a plurality of positions spaced along the longitudinal direction of the bent pipe, rather than only at both ends of the bent pipe.

Therefore, in the above-mentioned case, the first present-invention apparatus may further comprises a plurality of support members which can support the bent pipe from below and can be evacuated below. The plurality of these support members are arranged apart from each other along the longitudinal direction of the bent pipe. In accordance with this, the bent pipe can be suppressed from being softened and bowed due to its own weight to be deformed when the bent pipe is heated by the heating means in the hardening treatment.

However, since the hardening means interferes with the support member and it cannot pass through the supported point in the hardening treatment in a state where the plurality of these support members are always supporting the bent pipe, each of the support members is configured so as to be able to be evacuated below, as mentioned above. Such a support member can be constituted by preparing a receiving part for supporting the bent pipe at an end of an actuator, such as a pneumatic cylinder and a hydraulic cylinder, for example. Thereby, the support member can raise or lower the position of the receiving part by operation of the above-mentioned actuator. From viewpoints of easiness in handling and speed of response, etc., a pneumatic cylinder is preferred as the above-mentioned actuator.

Moreover, from a viewpoint of reducing deformation of the bent pipe in the hardening treatment, it is desirable to make an arrangement interval of the plurality of the support members narrower, as heating temperature in the hardening treatment is higher and as the extent of softening of the bent pipe is larger at the time of heating in the hardening treatment, for example. On the other hand, from a viewpoint of not preventing movement of the hardening means in the hardening treatment, it is desirable to make the arrangement interval of the plurality of the support members larger, as that moving velocity of the hardening means in the hardening treatment is higher. Accordingly, the arrangement interval of the plurality of the support members is properly determined in consideration of these factors.

Furthermore, as a matter of course, positions, at which the pluralities of the support members are arranged, are determined according to a shape of the bent pipe to be supported. In addition, depending on the extent of a curve of the bent pipe and the side of the receiving part of the support member, the plurality of the support members may be arranged approximately in a linear fashion in the longitudinal direction of the bent pipe.

In addition, an upper limit position of the receiving part of each support member is also determined according to the shape of the bent pipe to be supported, as a matter of course. The lower limit position of the receiving part of each support member is determined such that spacing sufficient for the hardening means to pass between the bent pipe and (the receiving part of) the support member is secured when it is evacuated below by the operation of the actuator.

In addition, holding and fixing of the bent pipe at the time of the hardening treatment only by supporting the bent pipe from below with the support members as mentioned above may be insufficient, for example, when very high accuracy of dimension is required. In such a case, for example, a pressing means to press the bent pipe downward from above in the vicinity of the hardening means may be further prepared. Since this pressing means needs to move along with the hardening means in the longitudinal direction of the bent pipe, it is desirable that this pressing means is connected with the tracing means.

Furthermore, since the pressing means presses the bent pipe at a position slightly apart from the hardening means in the longitudinal direction of the bent pipe, it results in that the pressing means presses the bent pipe at a position slightly apart from the hardening means also in a direction perpendicular to the longitudinal direction of the bent pipe. For this reason, the pressing means is connected with the tracing means in a state where the pressing means can move in the direction perpendicular to the longitudinal direction of the bent pipe. In addition, it is desirable to prepare a mechanism, such as a roller, etc., in a part of the pressing means, which contacts with the bent pipe, so as to be able to smoothly move in the longitudinal direction.

By the way, from a viewpoint of suppressing deformation of the bent pipe heated in the hardening treatment, it is desirable to make a period when the support member has been evacuated below as short as possible. Therefore, in the first present-invention apparatus which comprises the support members as mentioned above, it is desirable that the support members is evacuated below only when the hardening means passes through in the hardening treatment.

In the above-mentioned case, each of the above-mentioned plurality of the support members may be configured such that it is evacuated below when the above-mentioned hardening means is within a predetermined distance and supports the above-mentioned bent pipe from below when the above-mentioned hardening means is not within the predetermined distance. In accordance with this, the support member is evacuated below only when the hardening means approaches within a predetermined distance from the support member in the hardening treatment. Therefore, since the period when the support member has been evacuated below can be shortened, the heated bent pipe can be suppressed from being deformed without preventing the movement of the hardening means along the bent pipe in the hardening treatment.

Furthermore, the above-mentioned "predetermined distance" can be properly determined according to the shortest distance between the hardening means and the support member, at which the hardening means can pass through a point supported by the support member without interference between the hardening means and the support member even if evacuation of the support member is started when the hardening means is approaching the support member in the hardening treatment, for example. Therefore, the above-mentioned "predetermined distance" may be influenced by various factors, such as moving velocity of the hardening means, evacuation velocity of the support member by the actuator, sizes and shapes of the hardening means and the receiving part of the support member, etc., for example.

In addition, it can be detected whether the hardening means and the support member have approached within the above-mentioned "predetermined distance" by a sensor to detect a distance between the hardening means and the support member (for example, positions of the hardening means and/or the support member), for example. Alternatively, when the bent pipe and the hardening means are moved relatively with a ball screw rotated by a servomotor as mentioned above, the distance between the hardening means and the support member can be also detected based on the number of rotations of the ball screw.

By the way, as mentioned above, the cooling means is prepared adjoiningly on the rear side of the heating means in the moving direction of the hardening means with respect to the bent pipe. Thereby, the cooling means can rapidly cool the bent pipe heated by the heating means as the bent pipe and the hardening means move relatively.

However, the hardening means can comprise the cooling means on both sides of the heating means in the longitudinal direction of the bent pipe respectively. In accordance with this, the hardening treatment can be performed not only when moving the hardening means to one direction (forward) in the longitudinal direction of the bent pipe, but also when moving the hardening means to the reverse direction (backward). As a result, efficiency of the hardening treatment of the bent pipe by the first present-invention apparatus can be raised largely.

Furthermore, in a case where what is called "tempering" needs to be performed on the bent pipe, the hardening treatment may be performed when moving the hardening means forward in the longitudinal direction of the bent pipe (outward process), and a tempering treatment may be performed when moving the hardening means backward (homeward process). In accordance with this, since the hardening treatment and the tempering treatment can be continuously performed in one process, the treatment efficiency of the bent pipe by the first present-invention apparatus can be largely raised also in this case.

Heating temperature in the tempering treatment is lower (for example, 200° C.) as compared with that in the hardening treatment. In the first present-invention apparatus, for example, the tempering treatment can be performed by reducing the electric power supplied to the heating means, raising the moving velocity of the hardening means, decreasing the number of the support members supporting the bent pipe through control of the actuator, and/or reducing quantity of the coolant blown by the cooling means in the above-mentioned homeward process, as compared with those in the above-mentioned "outward process."

As a matter of course, only the cooling means on the rear side of the heating means in the moving direction of the hardening means is operated, not only when moving the hardening means to one direction (forward) in the longitudinal direction of the bent pipe, but also when moving it to the reverse direction (backward). Therefore, in both cases, the cooling means on the front side of the heating means in the moving direction of the hardening means is not operated.

By the way, as mentioned above, since the heating means is prepared only on the front side of a workpiece (long member) in a hardening method for a long member having a hat-like cross-section according to a conventional technology, an axis of the longitudinal direction of the workpiece after a hardening treatment may be distorted (warped) so as to become convex on the back side of the workpiece. When such distortion (warp) of the workpiece is large, it may become difficult to use the workpiece as a constituent member of a vehicle, for example.

Then, another objective of the present invention is to provide a hardening apparatus for a long member, which can reduce the distortion (warp) of an axis of the longitudinal direction of a workpiece after the hardening treatment in a case where a hardening treatment is partially performed only on a corner part region of the long member having a hat-like cross-section and a hardening treatment method using the hardening apparatus.

Through an extensive research for attaining the above-mentioned objective, the inventor has found out that the distortion (warp) of the axis of the longitudinal direction of the workpiece after the hardening treatment can be reduced by performing the hardening treatment not only on the corner part region on the front side of the workpiece (long member) (namely, a side of a top plate of the hat-like cross-section (which may be referred to as a "convex part side" and "top surface side")), but also on the corner part region on the back side of the workpiece.

In view of the points as mentioned above, a hardening apparatus according to the present invention for a long member having a hat-like cross-section (which may be referred to as a "second present-invention apparatus" hereafter) comprises a hardening means, a transportation means, and a control means.

The hardening means comprises a heating means and a cooling means, and cools rapidly a long member as a workpiece after heating the long member and thereby changes a structure of material, which constitutes the long member, and, for example, raises the mechanical strength of the material, etc. Since the hardening means, the heating means, and the cooling means which the second present-invention apparatus comprises have fundamentally same configurations as the hardening means, the heating means, and the cooling means which the above-mentioned first present-invention apparatus comprises, explanations thereof will not be repeated here.

However, as mentioned above, the second present-invention apparatus is a hardening apparatus for a long member, which can reduce the distortion (warp) of the axis of the longitudinal direction of the workpiece after the hardening treatment, when performing the hardening treatment partially only on the corner part region of the long member having a hat-like cross-section. Therefore, the heating means and the cooling means which the second present-invention apparatus comprises do not need to have hollow shapes (for example, a shape of a doughnut, etc.), through which the long member as a workpiece can pass, unlike the heating means and the cooling means which the above-mentioned first present-invention apparatus comprises.

The transportation means moves the long member and the above-mentioned hardening means relatively in the longitudinal direction of the above-mentioned long member. Since the transportation means which the second present-invention apparatus comprises has a fundamentally same configuration as that of the transportation means which the above-mentioned first present-invention apparatus comprises, explanations thereof will not be repeated here.

The control means performs the hardening treatment at least on a part of the above-mentioned long member by heating the above-mentioned long member with the above-mentioned heating means and cooling the above-mentioned long member with the above-mentioned cooling means thereafter. For example, when using an induction-heating coil as the heating means, the control means heats the long member by turning on electricity to the induction-heating coil. On the other hand, the cooling means is prepared adjoiningly on the rear side of the heating means in the moving direction of the hardening means with respect to the long member. Thereby, the cooling means can rapidly cool the long member heated by the heating means as the long member and the hardening means move relatively. In addition, the coolant (for example, water) for cooling the long member may be blown only in a period when the heating means is being operated, or may be blown continuously during operation of the second present-invention apparatus.

However, the above-mentioned hardening means is arranged so as to oppose a target corner part that is at least one corner part among two first corner parts which are two corner parts, at which flange parts and sidewall parts (both of which will be mentioned later in detail) intersect, and two second corner parts which are two corner parts, at which the sidewall parts and a top plate part intersect (which will be mentioned later in detail), at a predetermined spacing. Namely, the hardening means which the second present-invention apparatus comprises is arranged so as to oppose a corner part as a target of the hardening treatment (target corner part) among the two first corner parts and the two second corner parts at the predetermined spacing. Thereby, the second present-invention apparatus can partially perform the hardening treatment only on a region in the vicinity of the target corner part (namely, the target corner part and a region in the vicinity thereof, which will be referred to as a "target corner part region" hereafter).

In addition, the second present-invention apparatus further comprises a tracing gauge and a tracing means.

The tracing gauge is a member which has a shape corresponding to a ridge line shape consisting of the above-mentioned target corner part of the above-mentioned long member and is held in an attitude identical to that of the above-mentioned long member. Typically, the tracing gauge is a member which has a shape identical to that of the long member as a workpiece. However, the tracing gauge does not need to have a shape completely identical to that of the long member as a workpiece, as long as it is possible to determine a position of the target corner part by being traced by a guide part (which may be referred to as a "tracing member" and will be mentioned later) in a state where it is held in the predetermined attitude. Such a tracing gauge may be the long member as a workpiece itself, or a member produced separately from the long member by machining (cutting), etc., for example.

In addition, since there is a possibility that the hardening treatment of the long member may become uneven or the heating means may be damaged when a spatial relationship between the long member and the heating means deviates or the long member and the heating means interfere during the long member and the heating means are moving relatively, the spatial relationship between the long member and the heating means needs to be controlled strictly. Therefore, the tracing gauge needs to be held in an attitude identical to that of the long member as a workpiece. A method for holding the tracing gauge and the long member in an identical attitude is not limited in particular.

For example, when an industrial robot takes out the long member from the manufacturing equipment, with which the long member is manufactured, just before the hardening treatment by the second present-invention apparatus and attaches the same to the second present-invention apparatus, the attitude of the long member attached to the second present-invention apparatus by the above-mentioned industrial robot is always the same. Therefore, the tracing gauge can be held in an attitude identical to that of the long member as a workpiece by holding the tracing gauge in a same attitude as that of the above-mentioned attitude. On the other hand, when attaching the long member to the first present-invention apparatus by a manual operation, as compared with the case where an industrial robots are used as mentioned above, it is difficult to keep the long member attached to the second present-invention apparatus always in the same attitude. In such a case, for example, what is necessary is just to form a concave part (for example, cutout and notch, etc.), into which a convex part prepared in a mechanism (for example, chuck) for holding the long member in the second present-invention apparatus, at a part to be held (for example, an end) of the long member. Thereby, the attitude of the long member can be always made the same when attaching the long member to the second present-invention apparatus.

The tracing means is a member to transmit the shape of the tracing gauge traced by the guide part to the hardening means. Thereby, the hardening means can move along the shape of the bent pipe by moving along the shape of the tracing gauge traced by the guide part. As a result, it can be avoided that the spatial relationship between the long member and the heating means deviates or the long member and the heating means interfere. Therefore, the tracing means is configured so as to be able to move relatively to the long member and the tracing gauge, not only in the longitudinal direction of the long member and the tracing gauge, but also in the direction perpendicular to the longitudinal direction.

Furthermore, the tracing means is configured so as to be moved relatively to the long member by the transportation means. Specifically, for example, the tracing means moves relatively to the long member in association with the transportation means moving a base similar to the base mentioned above regarding the first present-invention apparatus, by being connected with the base. As a specific mechanism for constituting the tracing means so as to be moved relatively to the long member by the transportation means, for example, a mechanism similar to the mechanism mentioned above regarding the first present-invention apparatus can be employed (detailed explanations regarding the mechanism will be omitted). Thereby, the tracing means may be configured to be able to move relatively to the long member and the tracing gauge, not only in the longitudinal direction of the long member and the tracing gauge, but also in the horizontal direction perpendicular to the longitudinal direction. Furthermore, when the curve of the long member is three-dimensional, the tracing means can be configured to be able to move relatively to the long member and the tracing gauge, not only in the longitudinal direction of the long member and the tracing gauge, but also in the horizontal direction perpendicular to the longitudinal direction and in the vertical direction perpendicular to the longitudinal direction.

A guide part engaged with the tracing gauge in a manner slidable along the tracing gauge is held at one end of the tracing means. The guide part is not limited in particular as long as it is possible to be engaged with the tracing gauge in a manner slidable along the tracing gauge. For example, the guide part comprises two or more guide rollers, and fits the tracing gauge with these guide rollers. Thereby, the guide part can trace the shape of the tracing gauge in association with the transportation means relatively moving the long member and the tracing means.

On the other hand, the hardening means is held at the other end of the tracing means. Therefore, the shape of the tracing gauge traced by the guide part is transmitted to the hardening means through the tracing means. As a result, since the hardening means moves along the shape of the tracing gauge traced by the guide part, the hardening means can move along the ridge line shape which consists of the target corner part of the long member.

In accordance with the above, the guide part moves also in the direction perpendicular to the longitudinal direction of the long member and the tracing gauge along the tracing gauge, and thereby the hardening means moves along the ridge line shape which consists of the target corner part of the long member. Namely, in accordance with the second present-invention apparatus, it is possible to strictly control the spatial relationship between the target corner part of the long member and the heating means by a simple mechanical means. Furthermore, a changeover can be easily performed by exchanging the tracing gauge with that corresponding to a new workpiece. In addition, since such a simple mechanical means is used, the second present-invention apparatus can attain low cost and space-saving simultaneously, as compared with a case where an industrial robot is used.

By the way, from a viewpoint of more efficiently heating the target corner part by the heating means and cooling the target corner part by the cooling means in the second present-invention apparatus, it is desirable that hardening surfaces of the heating means and the cooling means, which are surfaces opposing the target corner part, have a shape along a hardening target surface of the target corner part, which is a surface opposing the heating means and the cooling means. Therefore, in the second present-invention apparatus, the hardening surfaces of the above-mentioned heating means and the above-mentioned cooling means, which are surfaces opposing the above-mentioned target corner part, may be configured so as to have a shape along a hardening target surface of the target corner part, which is a surface opposing the heating means and the cooling means. In accordance with this, heating of the target corner part by the heating means and cooling of the target corner part by the cooling means in the second present-invention apparatus can be performed more efficiently.

Preferably, the above-mentioned hardening target surface is a surface on an outside of the target corner part. The "outside of the target corner part" refers to a side, on which normal lines of respective principal surfaces of two members constituting the target corner part (a combination of a top plate part and a sidewall part and/or a combination of the sidewall part and a flange part) cannot intersect (a side, on which an angle between these two members is larger than 180 degrees), other than a side, on which these normal lines can intersect (a side, on which an angle between these two members is smaller than 180 degrees). In this case, the above-mentioned hardening surfaces have a shape which surrounds the target corner part from the outside.

In accordance with the above, quantity of heat given to the target corner part by the heating means and quantity of heat taken from the target corner part by the cooling means can be increased more. Specifically, for example, when using an induction-heating coil as the heating means and using a cooling jacket as the cooling means, electromagnetic waves generated from the induction-heating coil and coolant (for example, water) injected from the cooling jacket can be focused (concentrated) on the target corner part. As a result, heating of the target corner part by the heating means and cooling of the target corner part by the cooling means in the second present-invention apparatus can be performed much more efficiently. Typically, the two members which constitute the target corner part substantially intersect perpendicularly. In this case, the above-mentioned "hardening surface" (and the above-mentioned "hardening target surface") come to be a bent surface approximately in a shape of an L character.

In addition, like the above-mentioned first present-invention apparatus, also in the second present-invention apparatus, the above-mentioned control means may be held at the above-mentioned tracing means. Moreover, the second present-invention apparatus can also further comprise a weight which is connected with the above-mentioned control means and arranged so as to at least partially balance with the weight of the above-mentioned control means. Furthermore, also in the second present-invention apparatus, a plurality of support members which can support the above-mentioned long member from below and can be evacuated below may be arranged apart from each other along the above-mentioned longitudinal direction of the above-mentioned long member. In this case, each of the above-mentioned plurality of the support members may be configured such that it is evacuated below when the above-mentioned hardening means is within a predetermined distance and supports the above-mentioned long member from below when the above-mentioned hardening means is not within the predetermined distance. In addition, the above-mentioned hardening means can comprise the cooling means on both sides of the above-mentioned heating means in the above-mentioned longitudinal direction, respectively.

By the way, as mentioned in the beginning, the present invention relates also to a hardening treatment method for a long member which uses a hardening apparatus according to the present invention. A hardening treatment method using any one of the above-mentioned various second present-invention apparatuses among those hardening treatment methods for a long member (which may be referred to as a "second present-invention method" hereafter) is a hardening method including a hardening process in which a hardening treatment is performed on the above-mentioned target corner part by heating the above-mentioned target corner part by the above-mentioned heating means and thereafter cooling the above-mentioned target corner part by the above-mentioned cooling means while relatively moving the above-mentioned long member and the above-mentioned hardening means in the above-mentioned longitudinal direction by relatively moving the above-mentioned long member and the above-mentioned tracing means through the above-mentioned transportation means.

In the second present-invention method, as mentioned above, any one of the above-mentioned various second present-invention apparatuses is used to perform the hardening treatment on the corner part region of the long member having a hat-like cross-section. In the second present-invention apparatus, as mentioned above, the guide part moves along the tracing gauge also in the direction perpendicular to the longitudinal direction of the long member and the tracing gauge, and thereby the hardening means moves along the ridge line shape which consists of the target corner part of the long member with sufficient precision.

Therefore, in accordance with the second present-invention method, it is possible to control strictly the spatial relationship between the target corner part of the long member and the heating means by a simple mechanical means. Furthermore, a changeover can be easily performed by exchanging the tracing gauge with that corresponding to a new workpiece. In addition, since such a simple mechanical means is used, the second present-invention method can attain low cost and space-saving simultaneously, as compared with a hardening method according to a conventional technology.

Preferably, in the second present-invention method, it is desirable that the above-mentioned target corner part includes both the above-mentioned two first corner parts and the above-mentioned two second corner parts. In other words, in the second present-invention method, it is desirable to perform the hardening treatment on all the corner parts of the hat-like cross-section. In this case, the above-mentioned hardening process includes a first step and a second step shown below.

First step: The hardening treatment is performed on the above-mentioned two first corner parts by heating the above-mentioned two first corner parts by the above-mentioned heating means and thereafter cooling the above-mentioned two first corner parts by the above-mentioned cooling means while relatively moving the above-mentioned long member and the above-mentioned hardening means in the above-mentioned longitudinal direction by relatively moving the above-mentioned long member and the above-mentioned tracing means through the above-mentioned transportation means.

Second step: The hardening treatment is performed on the above-mentioned two second corner parts by heating the above-mentioned two second corner parts by the above-mentioned heating means and thereafter cooling the above-mentioned two second corner parts by the above-mentioned cooling means while relatively moving the above-mentioned long member and the above-mentioned hardening means in the above-mentioned longitudinal direction by relatively moving the above-mentioned long member and the above-mentioned tracing means through the above-mentioned transportation means.

In accordance with the above, the hardening treatment can be performed on all the four corner parts (two first corner parts and two second corner parts) of the hat-like cross-section, while moving the long member and the hardening means relatively in the longitudinal direction by moving the long member and the tracing means relatively by the transportation means. As a result, the mechanical strength of the long member can be raised effectively, while reducing the distortion (warp) of the axis in the longitudinal direction after the hardening treatment of the long member having a hat-like cross-section.

In addition, the first step and the second step in the hardening process may be performed simultaneously, or may be performed sequentially. When sequentially performing the first step and the second step, it is desirable to perform the above-mentioned second step after performing the above-mentioned first step, in the above-mentioned hardening process. Namely, it is desirable to perform the hardening treatment on the corner part on the front side (second corner part) after the corner part on the back side (first corner part) of the long member (workpiece) having a hat-like cross-section.

In accordance with the above, even when the distortion (warp) is generated on the axis in the longitudinal direction of the long member (workpiece) such that the workpiece becomes convex-like on the front side (namely, a top plate side in the hat-like cross-section) due to the hardening treatment on the two first corner parts (which are two corner parts, at which the flange parts and the sidewall parts intersect) in the first step, distortion (warp) in a direction opposite to that in the first step is generated by the hardening treatment on the two second corner parts (which are two corner parts, at which the sidewall parts and the top plate part intersect) in the following second step. As a result, the distortion (warp) generated in the first step is at least partially offset by the distortion (warp) generated in the second step, and the distortion (warp) of the axis in the longitudinal direction of the long member (workpiece) is reduced.

In addition, when the first step is performed after performing the second step in the hardening process, there is a possibility that excessive distortion (warp) may be generated in the axis of the longitudinal direction of the long member (workpiece) such that the workpiece may becomes convex-like on the back side (namely, the opposite side of the top plate side in the hat-like cross-section) due to the hardening treatment on the second corner part in the second step, this excessive distortion (warp) may not be fully offset by the distortion (warp) generated in the following first step, and the distortion (warp) of the axis in the longitudinal direction of the long member (workpiece) may not be fully reduced.

Although some embodiments of the hardening apparatus and the hardening method for a long member according to the present invention have been explained as mentioned above, other objectives, other features and accompanying advantages of the present invention will be easily understood from the following explanation about respective embodiments of the present invention described referring to drawings.

BRIEF DESCRIPTION OF DRAWINGS

FIG. 2 is (a) a left-side view of the first apparatus and (b) an enlarged view of a guide part at the start of execution of a hardening treatment.

FIG. 12 is (a) a schematic perspective view and (b) a schematic sectional view for showing a structure of a long member having a hat-like cross-section.

FIG. 15 is an enlarged view of a guide part which a fourth apparatus comprises.

DESCRIPTION OF EMBODIMENTS

First Embodiment

Hereafter, an example of a hardening apparatus according to one embodiment of the above-mentioned first the-present-invention (which may be referred to as a "first apparatus" hereafter) will be explained in detail, referring to drawings. In the present example, a case where a curve of the bent pipe is two-dimensional will be explained.

In addition, in the following explanation, a longitudinal direction of the bent pipe and the tracing gauge is defined as an X-axis direction, a direction which perpendicularly intersects with the X-axis direction in a horizontal plane is defined as a Y-axis direction, and a direction which perpendicularly intersects with these X-axis and the Y-axis is referred to as a Z-axis direction. Moreover, a direction toward the right side when the-present-invention apparatus is observed from its front side is defined as a positive direction in the X-axis direction, a direction toward the near side (direction toward an observer) when the-present-invention apparatus is observed from its front side is defined as a positive direction in the Y-axis direction, and a direction toward the upper side (a upward direction in the vertical direction) when the-present-invention apparatus is observed from its front side is defined as a positive direction in the Z-axis direction. As for constituent elements which have been already given reference signs clearly in any one of the drawings, they may not be given reference signs repeatedly in other drawings.

<Configuration>

Figure 1:
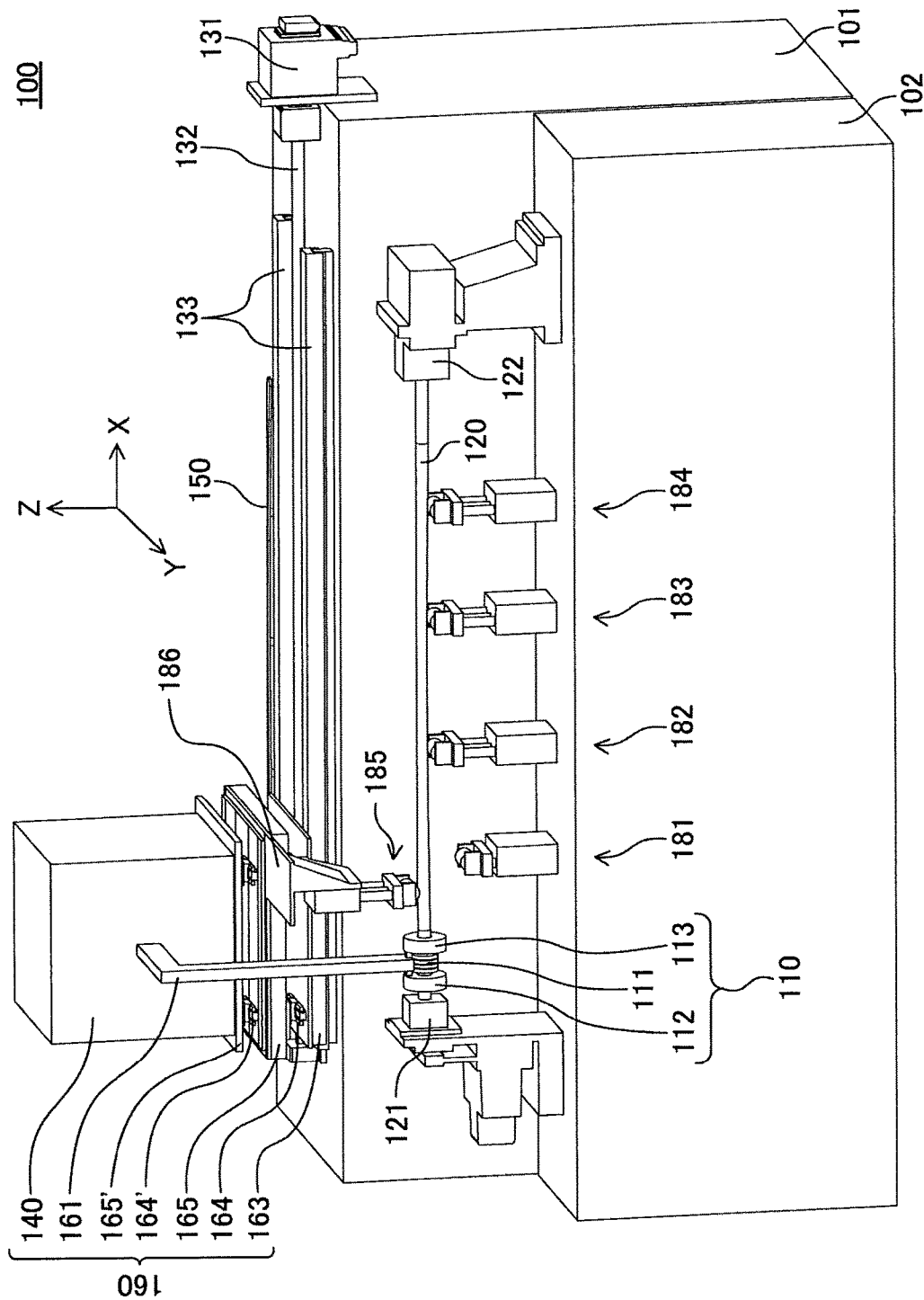
FIG. 1 is a perspective view of a hardening apparatus according to a first embodiment of the present invention (first apparatus) observed from its front side.

FIG. 1 and FIG. 2 area perspective view and a left-side view for showing the whole picture of the first apparatus 100, respectively. The first apparatus 100 comprises the hardening means 110, the transportation means 130, and the control means 140. In the present example, the transportation means 130 is constituted by the servomotor 131, the ball screw 132, the guide rail 133, and the base 163, but the number "130" for the transportation means is not shown in the drawing. In addition, in the first apparatus 100, the transportation means 130, the control means 140, the tracing gauge 150, and the tracing means 160 are disposed on the base 101.

The hardening means 110 further comprises the heating means 111 and the cooling means 112. The hardening means 110 further comprises the cooling means 113 also on the opposite side across the heating means 111. Namely, the hardening means 110 comprises the cooling means 112 and 113 respectively on both sides of the heating means 111 in the longitudinal direction of the bent pipe 120 (X-axis direction). Thereby, the first apparatus 100 can perform the hardening treatment also in any of the outward process and the homeward process when making the hardening means 110 move back and forth in the X-axis direction. However, it is not essential requirements for the the-present-invention apparatus that the hardening means 110 comprises the cooling means 112 and 113 on both sides of the heating means 111 like this.

The transportation means 130 relatively moves the bent pipe 120 as a workpiece and the hardening means 110. Specifically, the transportation means 130 rotates the ball screw 132 with the servomotor 131. The ball screw 132 is engaged with a nut (not shown) attached to the base 163, and is configured such that the base 163 moves in the X-axis direction along the guide rail 133 by rotation of the ball screw 132. The guide rail 133 is parallel to the longitudinal direction of the bent pipe 120 (X-axis direction). On the other hand, the arm 161 holding the hardening means 110 is connected with the base 163 (through the control means 140, etc.). Therefore, the transportation means 130 can move relatively the bent pipe 120 as a workpiece and the hardening means 110. In the present example, the bent pipe 120 is fixed by the chucks 121 and 122, and the hardening means 110 moves as mentioned above.

When the bent pipe 120 relatively and the hardening means 110 moved by the transportation means 130 attain a predetermined spatial relationship, the control means 140 heats the bent pipe 120 by the heating means 111, and cools the bent pipe 120 by the cooling means 112 or 113 thereafter. Thereby, the control means 140 performs the hardening treatment on a desired part of the bent pipe 120.

In addition, in the present example, the heating means 111 comprises an induction-heating coil and heats the bent pipe 120 by the induction heating using electric power supplied by a power unit which the control means 140 comprises. On the other hand, the cooling means 112 and 113 are shower-type cooling jackets in which a plurality of holes are drilled in a surface opposing the bent pipe 120 and cooling water is blown toward the bent pipe from the plurality of the holes. All of the heating means 111 and the cooling means 112 and 113 have a shape of a doughnut concentric with the bent pipe 120 such that the bent pipe 120 can pass through them.

In the first apparatus 100, the tracing gauge 150 which is a member having an axis shape identical to an axis shape of the bent pipe 120 is held in an attitude identical to that of the bent pipe 120, although they cannot be fully seen in FIG. 1 since they are partially behind the guide rail 133. In addition, in the present example, a cutout part is prepared at one end of the bent pipe 120 as a workpiece, a protrusion (convex part) is prepared in the chuck 121 or 122 to hold the end, and the attitude of the tracing gauge 150 and the attitude of the bent pipe 120 are conformed by fitting the cutout part and the protrusion.

Furthermore, the first apparatus further comprises the tracing means 160 which is a member configured to be able to relatively move with respect to the bent pipe 120 and the tracing gauge 150, not only in the longitudinal direction of the bent pipe 120 and the tracing gauge 150 (X-axis direction), but also in a direction perpendicular to the longitudinal direction (Y-axis direction). As can be easily understood from the side view shown in FIG. 2, the tracing means 160 transmits the shape of the tracing gauge 150 traced by the guide part 190 to the hardening means 110 through the arm 168, the base 165', the control means 140 and the arm 161. Namely, the hardening means 110 and the guide part 190 are held at the both ends of the tracing means 160, respectively.

The base 165' is engaged with the guide rail 164' disposed in the Y-axis direction on another base 165 and is laid so as to be able to move in the Y-axis direction, and the base 165 is also engaged with the guide rail 164 disposed in the Y-axis direction on another base 163 and is laid so as to be able to move in the Y-axis direction. Furthermore, as mentioned above, the base 163 is moved in the X-axis direction by the transportation means 130. By such a configuration, the tracing means 160 can relatively move with respect to the bent pipe 120 and the tracing gauge 150, not only in the longitudinal direction of the bent pipe 120 and the tracing gauge 150 (the X-axis direction), but also in the direction perpendicular to the longitudinal direction.

In order to attain only the objective of enabling the movement of the tracing means 160 in the Y-axis direction, one base laid so as to be able to move in the Y-axis direction is enough. In the present example, since the two bases 165 and 165' are laid so as to be able to move in the Y-axis direction as mentioned above, they can be utilized for alignment (adjustment) of the hardening means 110 and the guide part 190, etc., by fixing either one of the bases in a state where it is shifted a predetermined amount in the Y-axis direction.

In addition, although the above-mentioned guide part 190 is hidden by the control means 140 in FIG. 1, it is held at one end of the tracing means 160, and the hardening means 110 is held at the other end of the tracing means 160, as mentioned above.

The guide part 190 is engaged with the tracing gauge 150 in a slidable manner. In the present example, as shown in (b) of FIG. 2, the guide part 190 is constituted by the rollers 193a and 193b rotatably attached respectively to the two axes 192a and 192b disposed in parallel with the holding member 191.

In addition, as mentioned in the beginning, in the present example, the curve of the bent pipe 120 is two-dimensional. Specifically, when the bent pipe 120 is set in an X-Y plane, the bent pipe 120 is curved within the X-Y plane, but it is not curved in a direction perpendicular to the X-Y plane (namely, the Z-axis direction). Therefore, the guide part 190 just has to be able to trace the shape (curve) of the tracing gauge 150 in the X-Y plane. In other words, as long as the shape (curve) in the X-Y plane of the tracing gauge 150 is the same as that of the bent pipe 120, other shapes are not be limited in particular.

Accordingly, the tracing gauge 150 in the present example is a tabular member (plate member) corresponding to a cross-section of the bent pipe 120 in the X-Y plane. For this reason, as shown in (b) of FIG. 2, the rollers 193a and 193b of the guide part 190 are provided with brim (flange) such that they are not released from the tabular tracing gauge 150.

Furthermore, the first apparatus 100 comprises the above-mentioned pressing means 185. The pressing means 185 is held by the arm 186 attached to the base 165, and presses the bent pipe 120 downward from above in the vicinity of the hardening means 110. The pressing means 185 is at a position slightly apart (in front) from the hardening means 110 in the longitudinal direction of the bent pipe 120. Therefore, the position of the pressing means 185 may be shifted slightly in the Y-axis direction from the hardening means 110 due to the curve of the bent pipe 120. Since the pressing means 185 is connected with the base 165 which can move in the Y-axis direction, the base 165 and the base 165' can shift from each other and thereby the pressing means 185 can follow the shape of the bent pipe 120 independently of the hardening means 110 even when such a shift of the positions occurs. However, as mentioned above, the pressing means is not an essential constituent element of the-present-invention apparatus.

<Hardening Treatment>

The hardening treatment performed by the first apparatus 100 which has the configuration as mentioned above will be explained below in detail below.

<Preparation>

Figure 3:
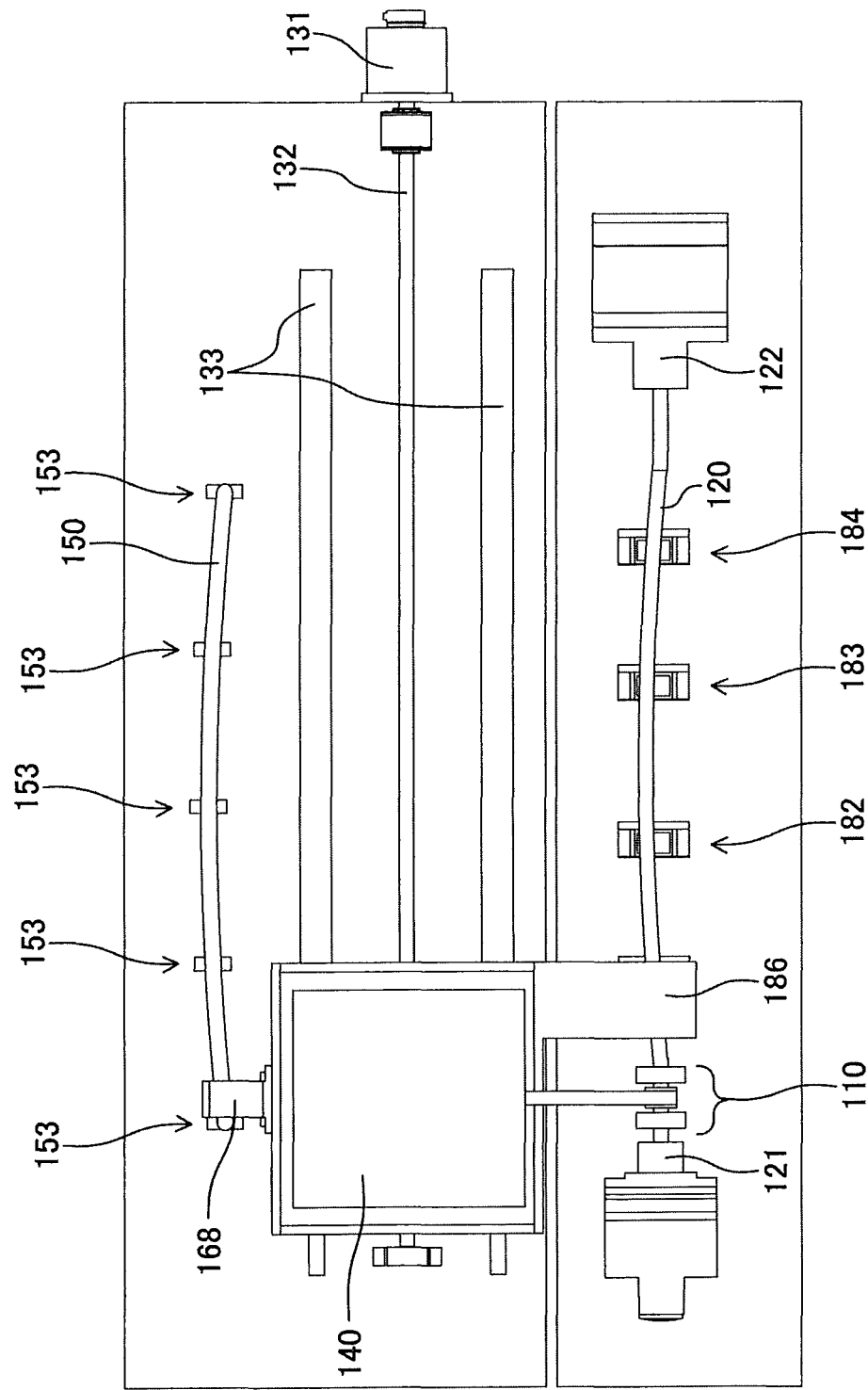
FIG. 3 is a plan view of the first apparatus at the start of execution of the hardening treatment.
Figure 4:
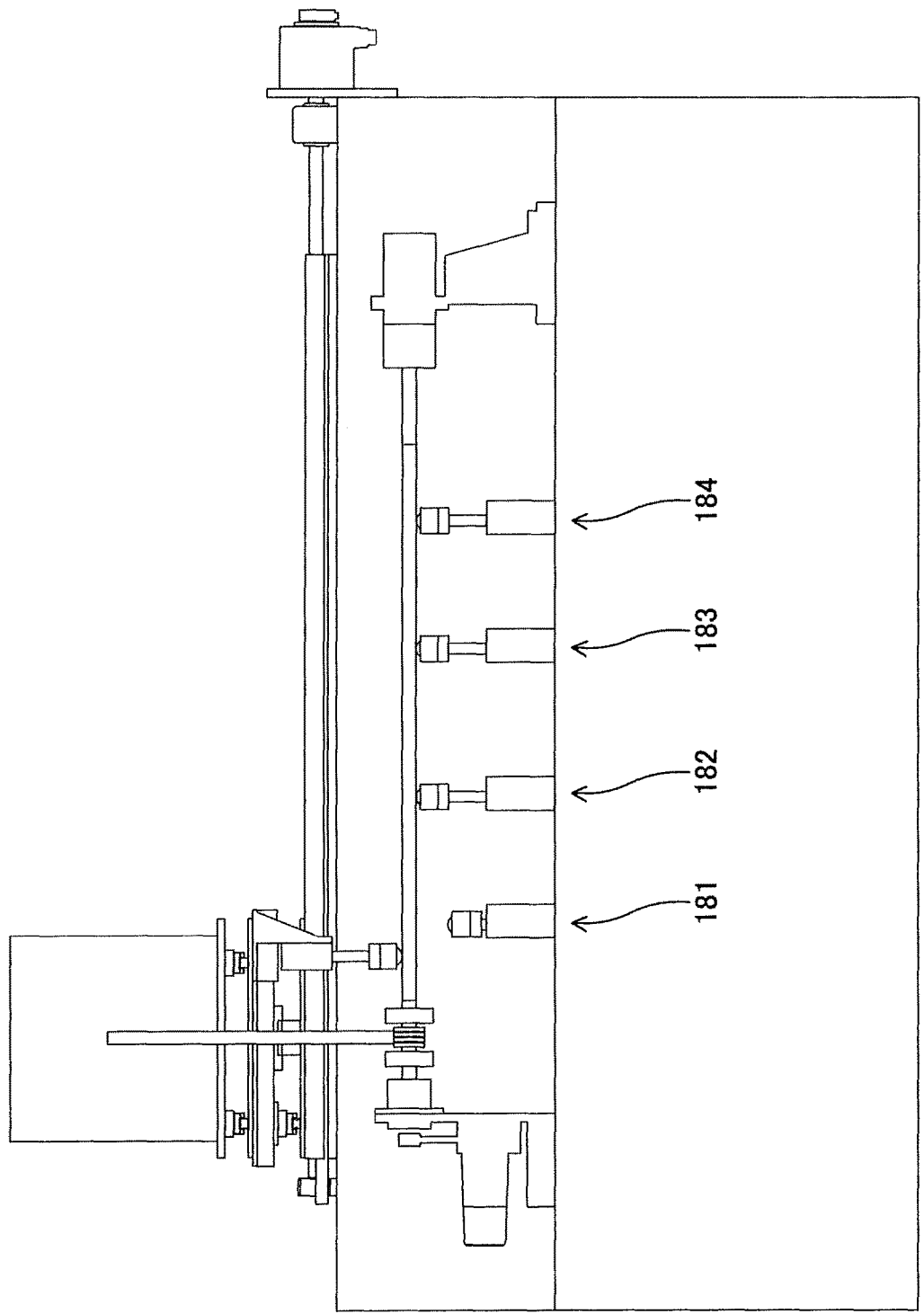
FIG. 4 is a front view of the first apparatus at the start of execution of the hardening treatment.

First, as shown in the plan view of FIG. 3 and the front view of FIG. 4, the hardening means 110 is made to stand by at the end on the negative direction side of the X-axis. Then, the bent pipe 120 as a workpiece is made to pass through the heating means 111 and the cooling means 112 and 113, and the both ends thereof are held (retained) by the chucks 121 and 122. On this occasion, the attitude of the bent pipe 120 is determined by fitting the cutout part formed at the end of the bent pipe 120 and the convex part formed in the chuck 121.

Furthermore, for the purpose of preventing the bent pipe 120 from bowing due to heating in the hardening treatment, the support members 181 to 184 are arranged on the upper part of the base 102. Furthermore, the receiving parts of the support members 181 to 184 are raised with pneumatic pressure supplied from an air compressor (not shown) to support the bent pipe 120. In FIG. 4, the receiving part of the support member 181 has been lowered. However, when there is time before the distance between the hardening means 110 and the support member 181 becomes a predetermined distance or shorter after the movement of the hardening means 110 starts, the receiving part of the support member 181 may have been raised.

On the other hand, the rollers 193a and 193b of the guide part 190 are contacted with the tracing gauge 150 (as shown in (b) of FIG. 2). The tracing gauge 150 is supported on its undersurface by a plurality of stands 153.

<Operation>

Figure 5:
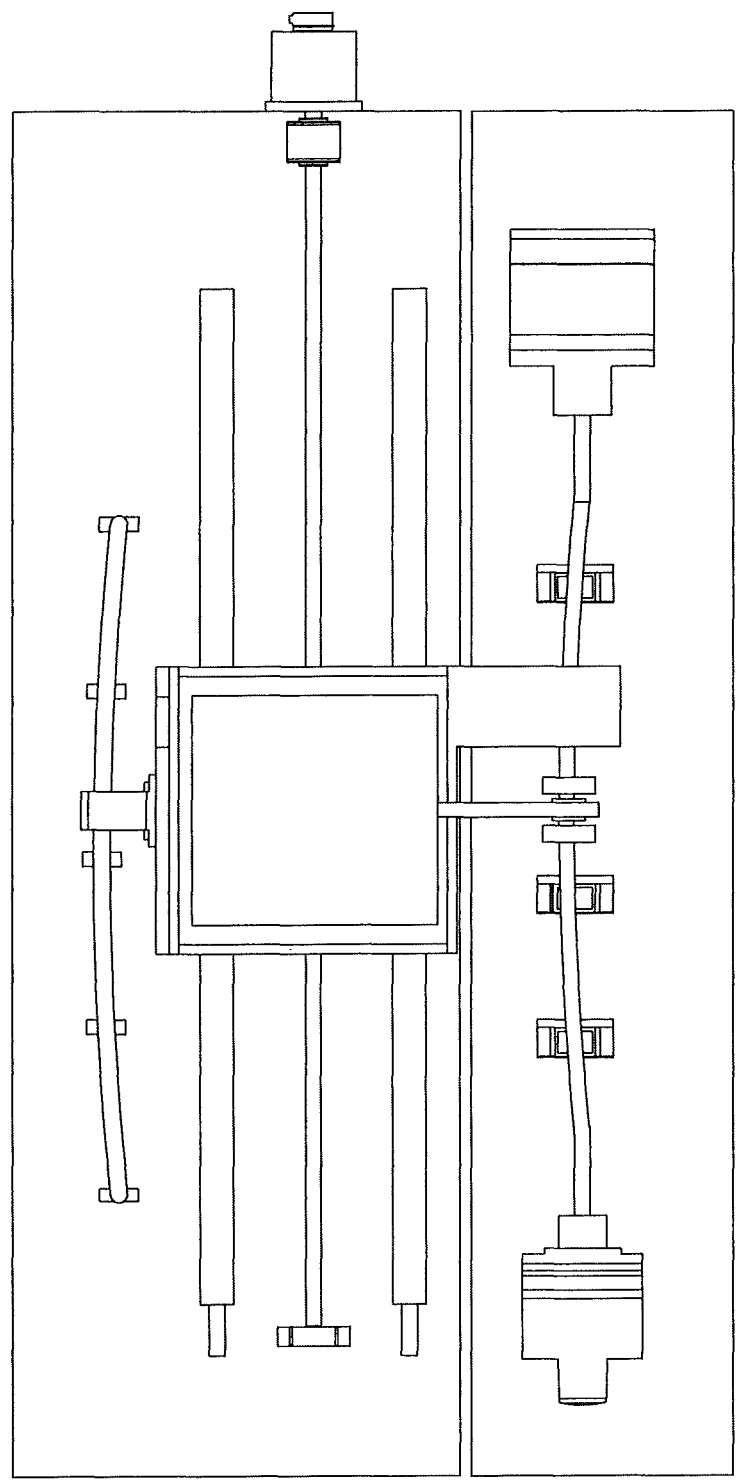
FIG. 5 is a plan view of the first apparatus in the middle of execution of the hardening treatment.
Figure 6:
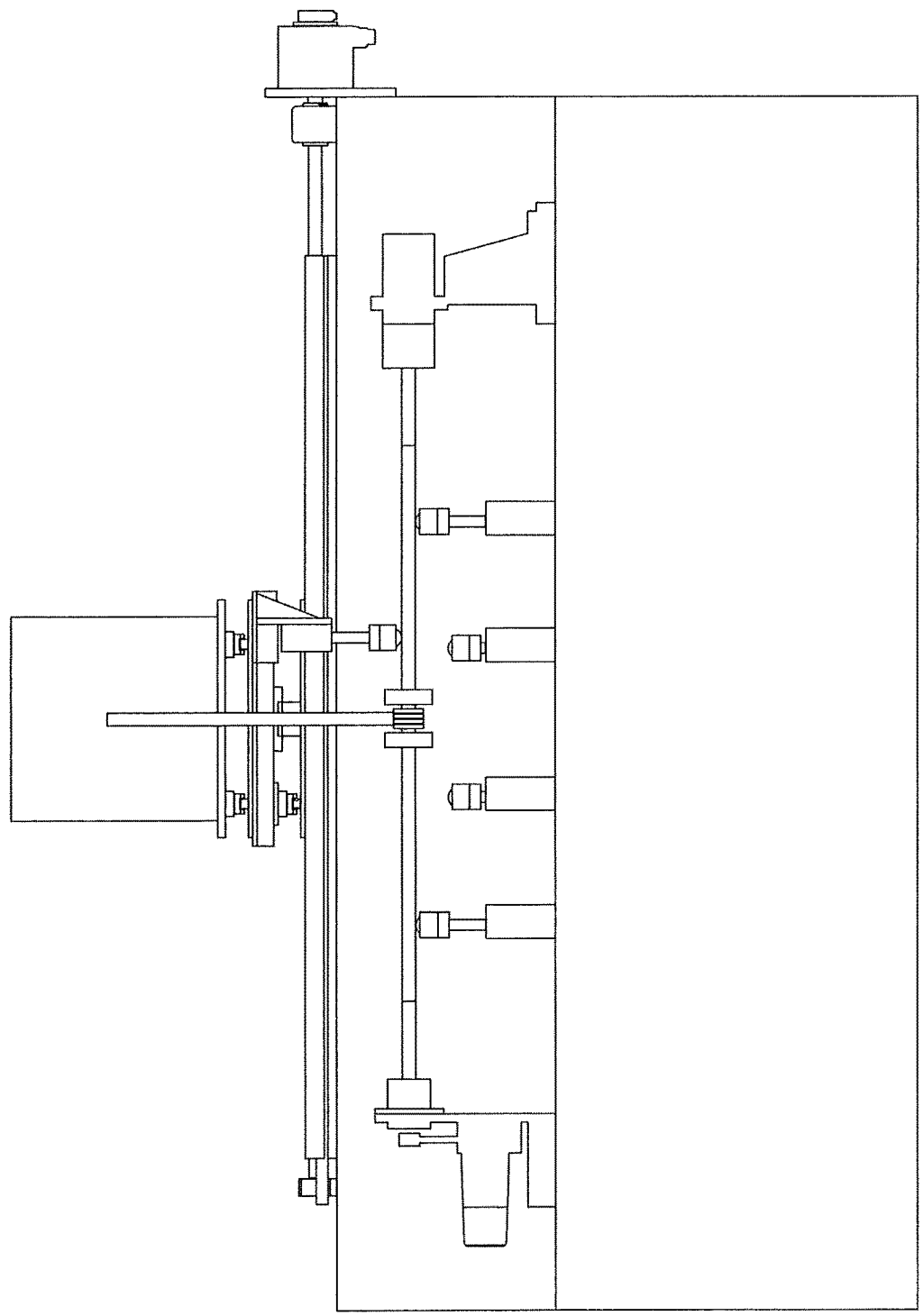
FIG. 6 is a front view of the first apparatus in the middle of execution of the hardening treatment.

Next, the base 163 is moved along the guide rail 133 toward the positive direction of the X-axis by operating the servomotor 131 to rotate the ball screw 132. A state in the middle of this movement is shown in the plan view of FIG. 5 and the front view of FIG. 6. Since each of the support members 181 to 184 evacuates according to the position of the hardening means 110 as shown in FIG. 6, an interference between the hardening means 110 and the support members 181 to 184 as mentioned above is avoided.

While the hardening means 110 is moving as mentioned above, the tracing means 160 moves also in the Y-axis direction according to the shape of the tracing gauge 150 traced by the guide part 190, while moving toward the positive direction of the X-axis. Thereby, the hardening means 110 can move along the bent pipe 120 with sufficient precision.

In the meantime, the control means 140 supplies electric power to the heating means 111 when the hardening means 110 is located in a point where the hardening treatment of the bent pipe 120 should be performed, and it does not supply electric power when it is not. Thereby, the first apparatus 100 can perform the hardening treatment only on a desired part of the bent pipe 120.

In accordance with the above, in the first apparatus 100, it is avoided that the spatial relationship between the bent pipe 120 and the heating means 111 deviates or, furthermore, the bent pipe 120 and the heating means 111 interfere when the bent pipe 120 and the heating means 111 move relatively. As a result, a possibility that the hardening treatment of the bent pipe 120 may become uneven or the heating means 111 may be damaged can be reduced.

When moving the hardening means 110 toward the positive direction of the X-axis as mentioned above, only the cooling means 112 which is in the rear side (negative direction side of the X-axis) of the heating means 111 in the moving direction of the hardening means 110 is operated, and the cooling means 113 on the front side (positive direction side of the X-axis) of the heating means 111 is not operated.

Figure 7:
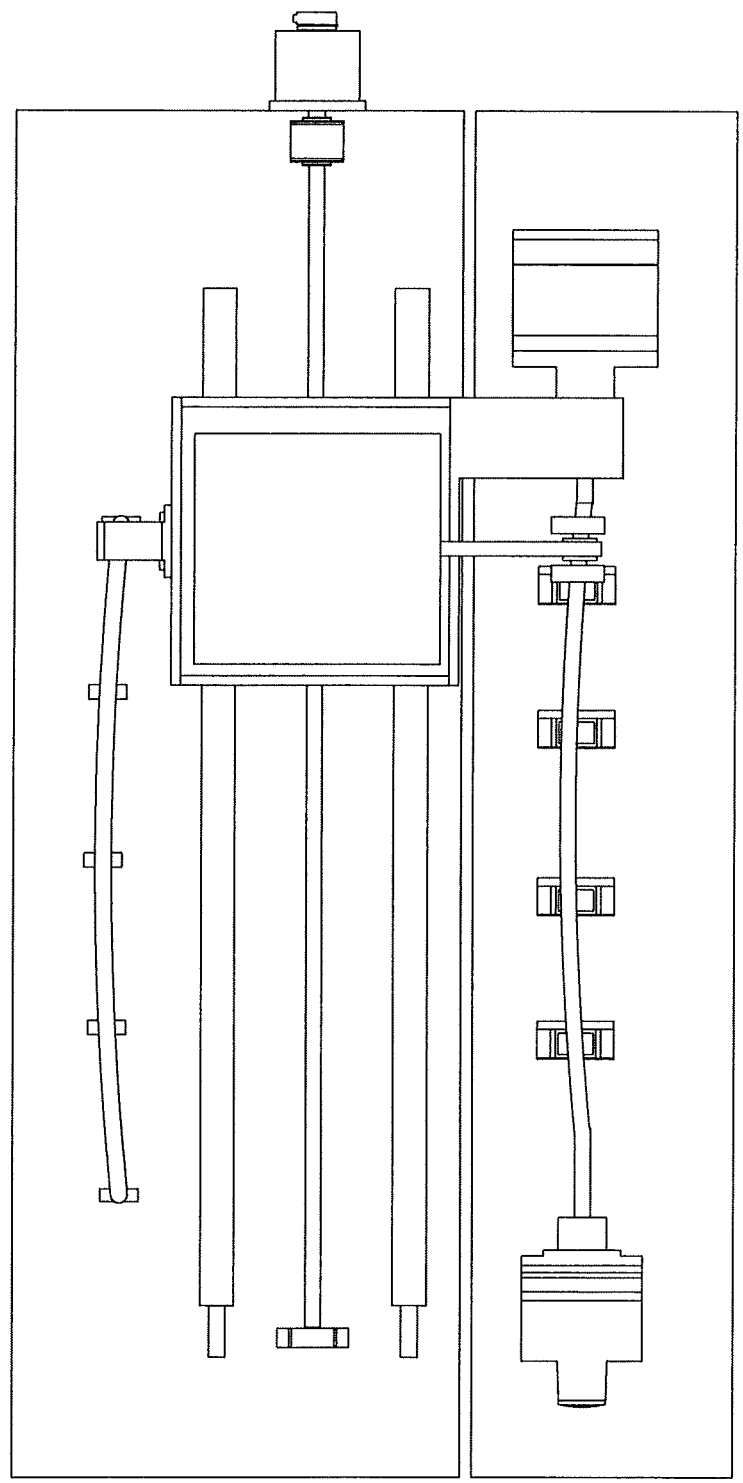
FIG. 7 is a plan view of the first apparatus at the end of execution of the hardening treatment.
Figure 8:
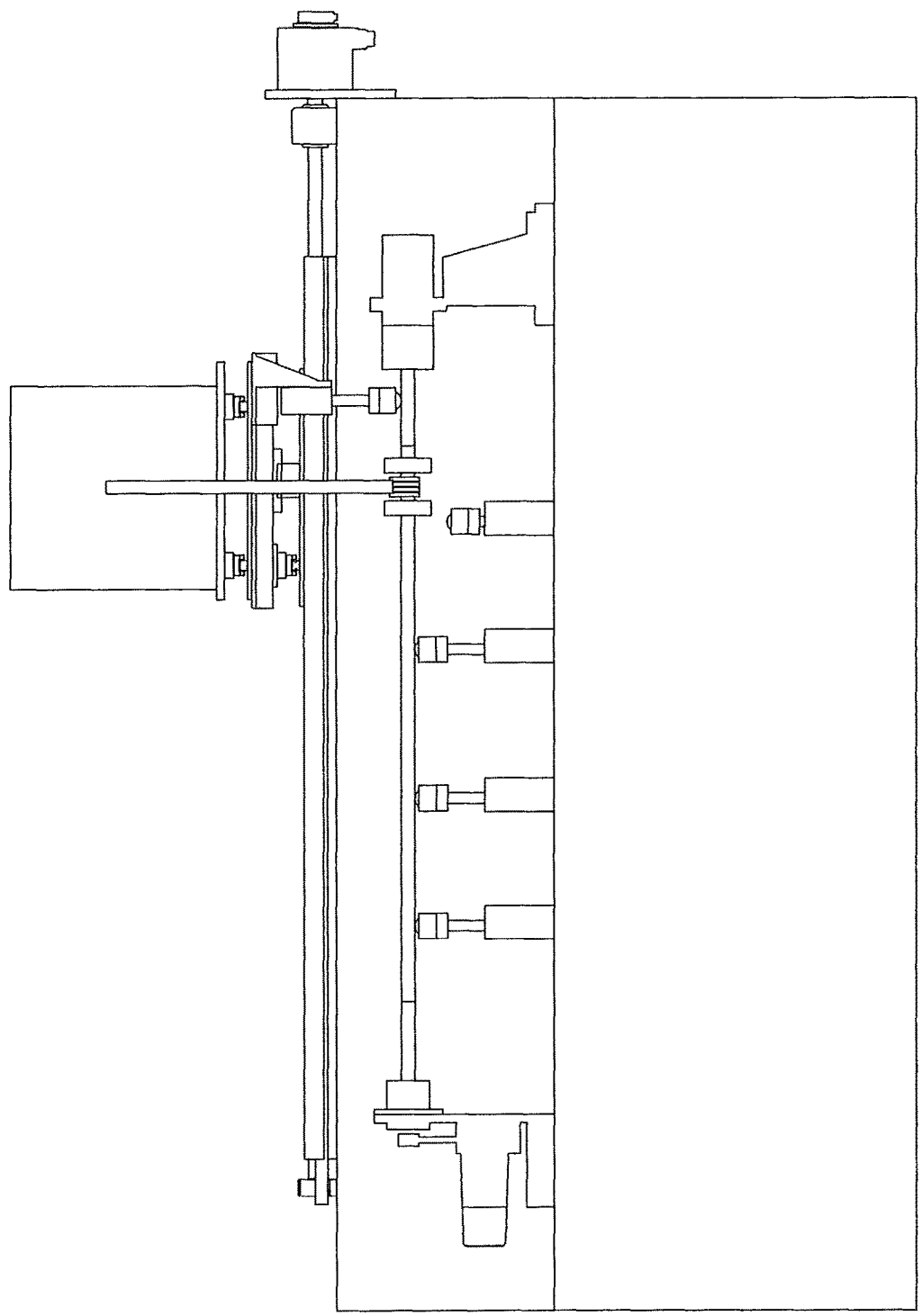
FIG. 8 is a front view of the first apparatus at the end of execution of the hardening treatment.

As shown in the plan view of FIG. 7 and the front view of FIG. 8, the hardening treatment is ended when the hardening means 110 arrives at the end of the positive direction of the X-axis. Thereafter, when performing the hardening treatment on another bent pipe 120, the both ends of the bent pipe 120 are released from the chucks 121 and 122, and the hardening-treated bent pipe 120 is taken out from the first apparatus 100. Then, after the following bent pipe 120 is made to be hold by the chucks 121 and 122, the same hardening treatment as the above can be performed while operating the servomotor 131 in a direction opposite to the above to move the hardening means 110 toward the negative direction of the X-axis.

Also when performing the tempering treatment, etc. on the treated bent pipe 120, the same hardening treatment as the above can be performed at predetermined heating temperature and cooling efficiency while operating the servomotor 131 in the direction opposite to the above to move the hardening means 110 at a predetermined velocity toward the negative direction of the X-axis.

In any case, when the hardening means 110 is moved toward the negative direction of the X-axis, only the cooling means 113 which is on the rear side (positive direction side of the X-axis) of the heating means 111 in the moving direction of the hardening means 110 is operated, and the cooling means 112 on the front side (negative direction side of the X-axis) of the heating means 111 is not operated.

In the present example, the bent pipe 120 and the tracing gauge 150 are fixed as mentioned above, and the hardening means 110 and the guide part 190 are moved in the X-axis direction. However, as mentioned above, the hardening means 110 and the guide part 190 may be fixed, and the bent pipe 120 and the tracing gauge 150 may be moved.

<Effects>

As mentioned above, in accordance with the first apparatus 100, it is possible to control strictly the spatial relationship between the bent pipe 120 and the heating means 111 by a simple mechanical means. Furthermore, a changeover can be easily performed by exchanging the tracing gauge 150 with that corresponding to a new workpiece. In addition, since such a simple mechanical means is used, the first apparatus 100 can attain low cost and space-saving simultaneously, as compared with a case where an industrial robot is used.

Second Embodiment

Hereafter, an example of a hardening apparatus according to another embodiment of the above-mentioned first present-invention apparatus (which may be referred to as a "second apparatus" hereafter) will be explained in detail, referring to drawings. In the present example, a case where the curve of the bent pipe is three-dimensional will be explained.

<Configuration>

Figure 9:
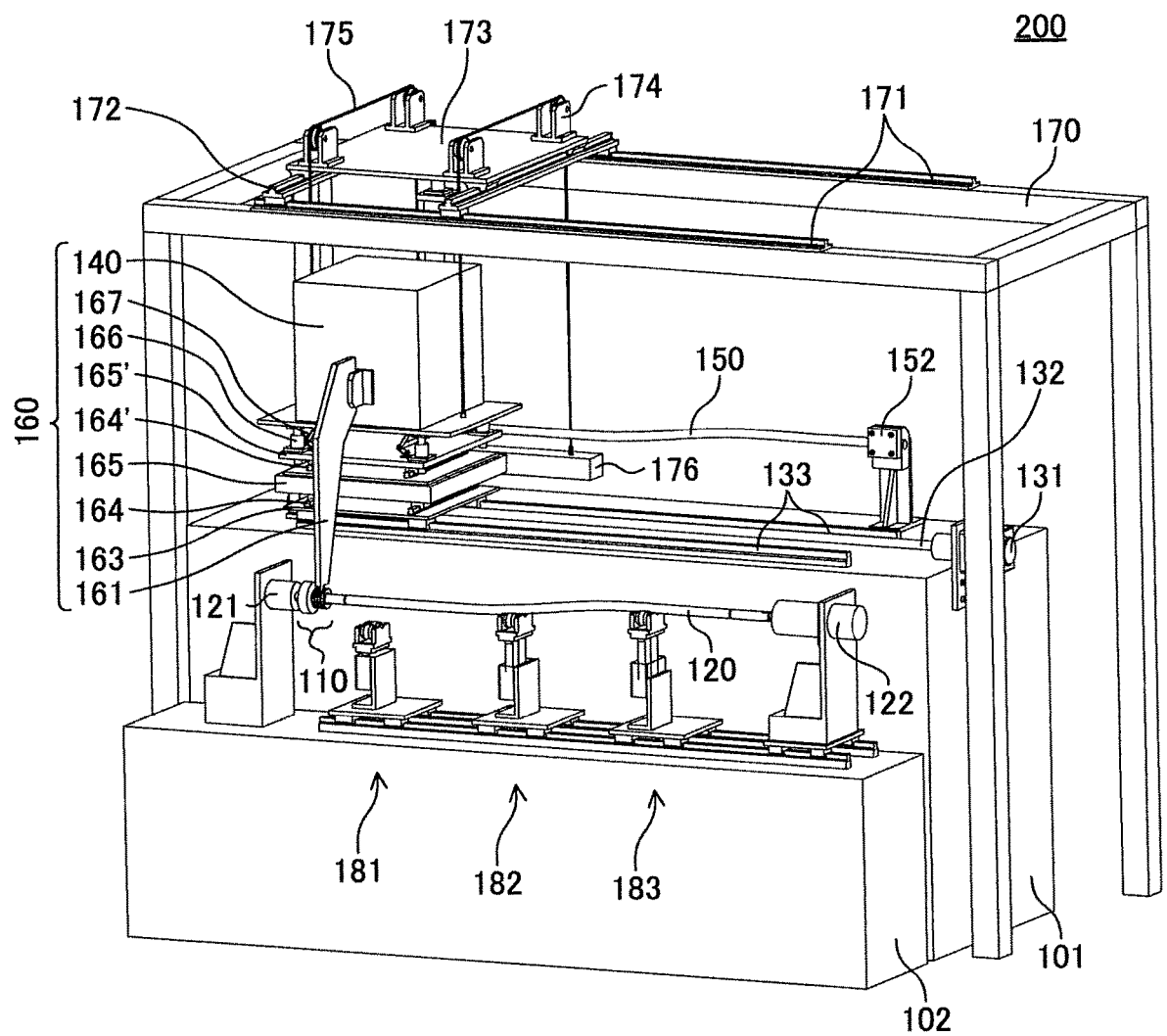
FIG. 9 is a perspective view of a hardening apparatus according to the second embodiment of the present invention (second apparatus) observed from its front side.
Figure 10:
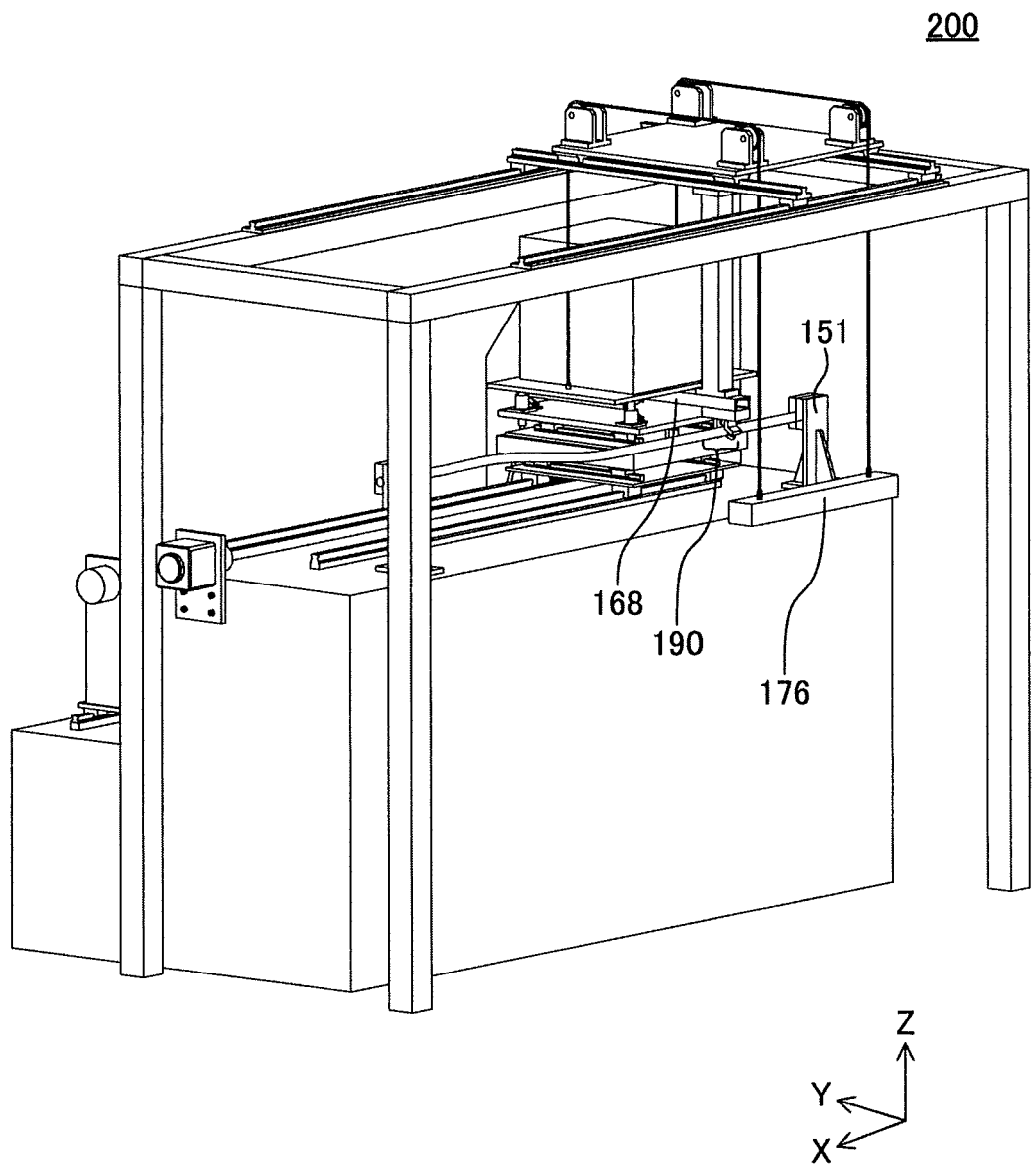
FIG. 10 is a perspective view of the second apparatus observed from its back side.

FIG. 9 and FIG. 10 are perspective views for showing the whole picture of the second apparatus 200 observed from its front side and back side respectively. Basically, the second apparatus 200 has the same configuration as that of the first apparatus 100 except for a point that it has a mechanism which enables tracing in the Z-axis direction since the curve of the bent pipe is three-dimensional as mentioned above. Therefore, in the following explanation, a configuration which is different from that of the first apparatus 100 will be explained in detail, and an explanation about the same configuration as that of the first apparatus 100 may be omitted.

First, since the tracing gauge 150 used in the second apparatus 200 has a three-dimensional curve, both ends thereof are supported and fixed with the holders 151 and 152 unlike the tabular tracing gauge 150 which is specialized in the two-dimensional curve and used in the first apparatus 100.

Since the tracing means 160 in the second apparatus 200 needed to be able to move also in the Z-axis direction, the slider 166 and the pantograph 167 are disposed on the base 165' referred to in the explanation of the first apparatus 100, and the control means 140 is laid thereon. The slider 166 and the pantograph 167 constitute a mechanism for permitting movement in the vertical direction (Z-axis direction), but not permitting movement in the horizontal direction (movement in the X-Y plane), and do not provide driving force in the Z-axis direction. Thereby, the tracing means 160 in the second apparatus 200 can move in all the directions of the X-axis, the Y-axis, and the Z-axis.

Furthermore, the second apparatus 200 comprises a weight and a mechanism for hanging the weight, etc., for the purpose of reducing load applied to the tracing means 160 due to the mass of the control means 140 to make smooth the movement of the tracing means 160 in the Z-axis direction.

Specifically, the second apparatus 200 comprises the frame 170, and the guide rail 171 parallel to the X-axis direction is prepared on the upper part of this frame 170. Furthermore, another guide rail 172 which is engaged with this guide rail 171 and can move in the X-axis direction is laid. This guide rail 172 is a guide rail parallel to the Y-axis direction. In addition, the four pulleys 174 are disposed respectively on four corners of the base 173 which is engaged with this guide rail 172 and can move in the Y-axis direction. The wires 175 are wound around these pulleys 174, (board at the bottom of) the control means 140 is connected with one end thereof, and the weight 176 is connected with the other end, respectively.

Since the mass of the control unit 140 and the mass of the weight 176 are balanced by the mechanism as mentioned above, although the control unit 140 has large mass, the tracing means 160 and the hardening means 110 including the control unit 140 can be smoothly moved by the movement of the guide part 190 which traces the tracing gauge 150, in all the directions of the X-axis, the Y-axis, and the Z-axis. In addition, when the weight 176 sways in association with the movement of the control unit 140, a rail for regulating the movement of the weight 176 in the vertical direction, etc. may be further prepared, for example.

By the way, although the first apparatus 100 is intended for the hardening treatment of the bent pipe 120 having a two-dimensional curve, the second apparatus 200 is intended for the hardening treatment of the bent pipe 120 having a three-dimensional curve. Therefore, the guide parts 190 of the second apparatus 200 needs to accurately trace the tracing gauge 150 having a three-dimensional curve as mentioned above, unlike the guide part 190 of the first apparatus 100. Therefore, as the tracing gauge 150 which the second apparatus 200 uses, that having the same shape as the bent pipe 120 which is the target of the hardening treatment is generally used.

Figure 11:
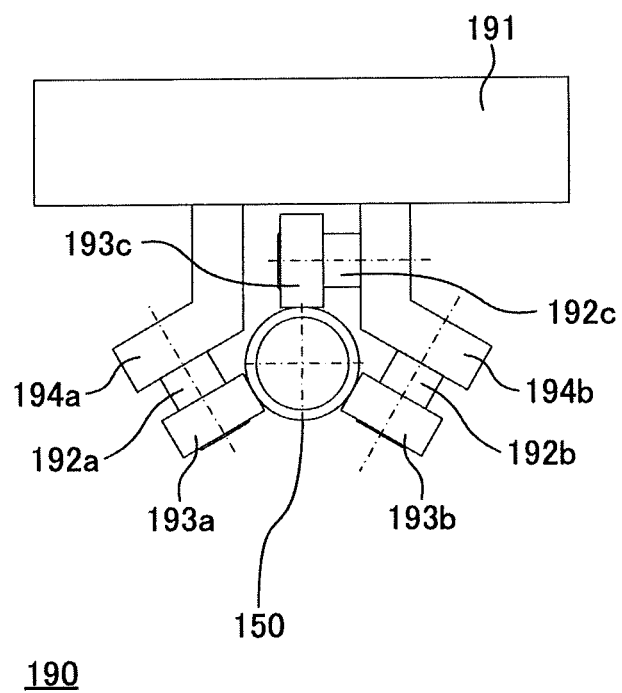
FIG. 11 is an enlarged view of a guide part which the second apparatus comprises.

Therefore, the guide part 190 of the second apparatus 200 also needs to be configured so as to be able to accurately trace a three-dimensional change of the shape. For example, when using the tubular tracing gauge 150 having a shape identical to that of the bent pipe 120, it is desirable that the guide part 190 is configured to contact with the tracing gauge 150 from at least 3 directions, as exemplified in FIG. 11. Specifically, the guide part 190 shown in FIG. 11 is constituted by the roller 193a rotatably attached to the axis 192a prepared on the stay 194a attached to the holding member 191, the rollers 193b and 193c rotatably attached to the axis 192b and the axis 192c prepared on the stay 194b attached to the holding member 191, respectively.

In addition, in the second apparatus 200, it is desirable that the upper limit position of the receiving part of the support member for supporting the bent pipe 120 can be separately controlled according to the holding attitude of the bent pipe 120.

<Operation>

Since an operation of the second apparatus 200 in the hardening treatment is basically the same as the operation of the first apparatus 100, an explanation thereof is omitted here.

<Effects>

As mentioned above, in accordance with the second apparatus 200, it is possible to control strictly the spatial relationship between the bent pipe 120 and the heating means 111 by a simple mechanical means even when the bent pipe 120 has a three-dimensional curve. Furthermore, a changeover can be easily performed by exchanging the tracing gauge 150 with that corresponding to a new workpiece. In addition, since such a simple mechanical means is used, the second apparatus 200 can attain low cost and space-saving simultaneously, as compared with a case where an industrial robot is used.

<Supplement>

By the way, as mentioned in the beginning, in a state where the spatial relationship between the bent pipe and the heating means deviates when the bent pipe and the heating means move relatively, there is a possibility that the hardening treatment of the bent pipe may become uneven. However, for example, in a case where the shape of the bent pipe hardening processed is slightly shifted from the desired shape, etc., the above-mentioned shift of the shapes may be able to be corrected by intentionally biasing the spatial relationship between the bent pipe and the heating means.

Therefore, the hardening apparatus according to a modification of the present invention may comprise an adjuster mechanism for changing the spatial relationship between the bent pipe as a workpiece and the heating apparatus (for example, deviation between the axis of the bent pipe passing through the inside of an induction-heating coil as a heating apparatus and the axis of the induction-heating coil, etc.), etc., in addition to technical features which have been mentioned above.

Third Embodiment

Hereafter, an example of the hardening apparatus according to one embodiment of the above-mentioned second present-invention apparatus (which may be referred to as a "third apparatus" hereafter) will be explained in detail, referring to drawing sheets.

<Long Member Having Hat-Like Cross-Section>

First, structure of the long member 1 having a hat-like cross-section as a workpiece which is a target of the hardening treatment by the third apparatus is shown in FIG. 12. (a) is a perspective view of the long member 1, and (b) is a sectional view of the long member 1 along a plane perpendicular to the longitudinal direction (X-axis direction) (plane parallel to a Y-Z plane).

The long member 1 comprises one top plate part 2, two sidewall parts 3, and two flange parts 4. The two sidewall parts 3 are respectively extending toward the same direction (in the present example, negative direction side of the Z-axis) from both ends of the top plate part 2 on the same one of two principal surfaces of the top plate part 2. The two flange parts 4 are respectively extending toward the opposite sides of the top plate part 2 across the sidewall parts 3 (the positive direction side and the negative direction side of the Y-axis) from the ends of the two sidewall parts 3 on an opposite side of the top plate part 2 (negative direction side of the Z-axis). As shown by the hatched area in FIG. 12, the cross-section perpendicular to the longitudinal direction of the long member 1 has a hat-like shape.

The long member 1 has two first corner parts 5 (a thick solid line and black round mark) which are two corner parts, at which the sidewall parts 3 and the top plate parts 2 intersect, and the two second corner parts 6 (a thick broken line and outlined white round mark) which are two corner parts, at which the flange parts 4 and the sidewall parts 3 intersect. The long member 1 which has such a structure can be formed by press processing on super-high-tensile strength steel sheet, for example.

In FIG. 12, an example in which all the angles between the top plate part 2 and the sidewall parts 3 and the angles between the sidewall parts 3 and the flange parts 4 are right angle is shown. However, all or a part of these angles do not have to be necessarily right angle. For example, the top plate part 2 and the wall part 3 may intersect at an angle such that the two wall parts 3 become more distant from or conversely closer to each other as they becomes further from the top plate part 2. Moreover, the wall part 3 and the flange parts 4 may intersect at an angle such that the flange parts 4 become more distant from or conversely closer to the top plate part 2 as they becomes further from the wall parts 3.

Furthermore, for the purpose of making it easy to understand the structure of the long member 1 having a hat-like cross-section, the long member 1 with its axis in the longitudinal direction (X-axis direction) which is not curved is shown in FIG. 12. However, the axis of the long member 1 in the longitudinal direction may be curved in two dimensions or in three dimensions according to an intended use of the long member 1, etc. In the present example, a case where the axis of the long member 1 in the longitudinal direction is two-dimensionally curved in an X-Y plane will be explained.

<Configuration of Third Apparatus>

Basically, the third apparatus has the same configuration as that of the first apparatus 100 except for a point that the long member as a workpiece which is a target of the hardening treatment is a long member having a hat-like cross-section, other than a bent pipe. Therefore, in the following explanation, a configuration which is different from that of the first apparatus 100 will be explained in detail, and an explanation about the same configuration as that of the first apparatus 100 may be omitted.

Specifically, in the long member 1 having a hat-like cross-section and an axis of the longitudinal direction curved only in two dimensions (namely, in an X-Y plane), the third apparatus partially performs the hardening treatment only on the corner part region of the hat-like cross-section, while reducing the distortion (warp) of the axis of the long member in the longitudinal direction after the hardening treatment. In addition, the third apparatus performs the hardening treatment on all the regions (corner part regions) in the vicinity of a total of the four corner parts consisting of the two first corner parts 5 and the two second corner parts 6. Namely, in the third apparatus, all a total of the four corner parts of the two first corner parts 5 and the two second corner parts 6 are the corner parts as the target of the hardening treatment (target corner parts).

(Configuration of Hardening Means)

Figure 13:
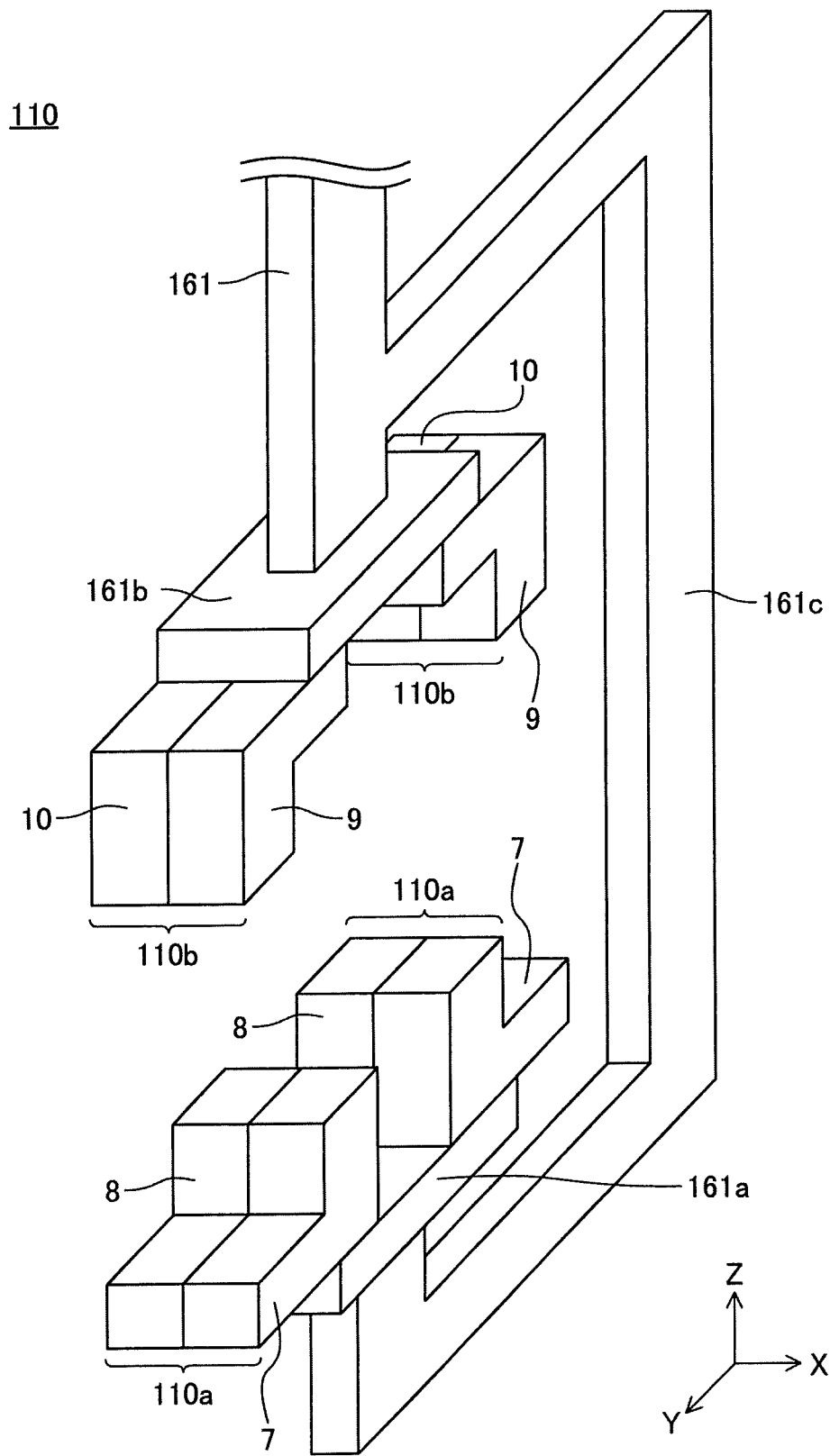
FIG. 13 is a schematic perspective view for showing a configuration of a hardening means which an example of the hardening apparatus according to one embodiment of the second present-invention apparatus (third apparatus) comprises.

Then, as shown in FIG. 13, the hardening means 110, which the third apparatus comprises, comprises two hardening means 110*a* respectively arranged so as to oppose the two first corner parts 5 of the long member 1 at a predetermined spacing and two hardening means 110*b* respectively arranged so as to oppose the two second corner parts 6 of the long member 1 at a predetermined spacing. The two hardening means 110*a* are fixed to a connection member 161*a* at a predetermined interval so as to respectively oppose the two first corner parts 5 at a predetermined spacing. Similarly, the two hardening means 110*b* are fixed to a connection member 161*b* at a predetermined interval so as to respectively oppose the two second corner parts 6 at a predetermined spacing.

Furthermore, the two connection members 161*a* and 161*b* are connected with each other by a further connection member 161*c* such that the two hardening means 110*a* and the two hardening means 110*b* respectively oppose the two first corner parts 5 and the two second corner parts 6 at a predetermined spacing. In addition, the connection member 161*c* has a shape curved in the Y-Z plane so as not to interfere with the long member 1 during the execution of the hardening treatment.

In addition, the connection member 161*c* is fixed to the arm 161 connected with the base 163 through the control-means 140, etc. Therefore, as mentioned above about the first apparatus, the transportation means 130 can relatively move the long member 1 and the hardening means 110 as a workpiece. Namely, in the third apparatus, the hardening treatment can be performed on all the regions in the vicinity of the four target corner parts (target corner part regions). Since the configuration for relatively moving the long member 1 and the hardening means 110 with the transportation means 130 and the operation thereof are fundamentally the same as those in the above-mentioned hardening means 110, a detailed explanation is omitted here.

In the present example, in both the hardening means 110*a* and 110*b*, an induction-heating coil is adopted as the heating means, and a cooling jacket which uses water as coolant is adopted as the cooling means. Moreover, each hardening means 110*a* comprises the heating means 7 on the front side and the cooling means 8 on the rear side in the traveling direction of the hardening means 110 with respective to the long member 1 (positive direction of the X-axis), respectively. Similarly, each hardening means 110*b* comprises the heating means 9 on the front side and the cooling means 10 on the rear side in the traveling direction of the hardening means 110 with respective to the long member 1, respectively.

Furthermore, the hardening surfaces of the heating means 7 and 9 and the cooling means 8 and 10 that the hardening means 110*a* and 110*b* comprise, which are surfaces opposing the target corner parts (the two first corner parts 5 and the two second corner parts 6), have shapes corresponding to (along) the shapes of the target corner parts. Namely, the above-mentioned "hardening surfaces" have shapes along the shapes the hardening target surfaces of the target corner parts, which are surfaces opposing the heating means 7 and 9 and the cooling means 8 and 10. Specifically, as shown in FIG. 13, the hardening surfaces of the hardening means of the third apparatus are configured so as to be bent surfaces approximately in a shape of an L character, which surround the target corner parts from the outside.

(Configuration of Tracing Gauge and Tracing Means)

The third apparatus also further comprises the tracing gauge and the tracing means. The tracing gauge is a member which has a shape corresponding to a ridge line shape consisting of the target corner parts of the long member 1, and is held in an attitude identical to that of the long member 1. The tracing means is a member configured so as to be able to move relatively with respective to the long member 1 and the tracing gauge, not only in the longitudinal direction of the long member 1 and the tracing gauge (X-axis direction), but also in the direction perpendicular to the longitudinal direction (Y-axis direction). Since the configuration and operation of the tracing gauge and the tracing means are basically same as those of the above-mentioned first apparatus, a detailed explanation is omitted here.

<Effects>

In accordance with the above, the guide part 190 moves also in the direction perpendicular to the longitudinal direction of the long member and the tracing gauge along the tracing gauge, and thereby the hardening means 110 moves along the ridge line shape which consists of the target corner parts of the long member. Namely, in accordance with the third apparatus, it is possible to perform the hardening treatment on all the regions in the vicinity of the four target corner parts of the hat-like cross-section (target corner part regions), while strictly controlling the spatial relationship between the long member 1 and the heating means 110 by a simple mechanical means. Furthermore, a changeover can be easily performed by exchanging the tracing gauge with that corresponding to a new workpiece. In addition, since such a simple mechanical means is used, the third apparatus can attain low cost and space-saving simultaneously, as compared with a case where an industrial robot is used.

<Supplement>

By the way, as mentioned above, each of the hardening means 110*a* and 110*b*, which the third apparatus comprises, comprises the heating means 7 and 9 on the front side and the cooling means 8 and 10 on the rear side in the traveling direction of the hardening means 110 with respect to the long member 1 (positive direction of the X-axis), respectively. However, the hardening means 110*a* and 110*b* may comprise secondary (additional) cooling means 8 and 10 not only on the rear side, but also on the front side of the heating means 7 and 9, respectively. In accordance with this, the hardening treatment (or the tempering treatment) can be performed, not only when moving the hardening means 110*a* and 110*b* to one direction in the longitudinal direction of the long member 1, but also when moving the hardening means 110*a* and 110*b* to the reverse direction thereof. As a result, the efficiency of the hardening treatment of the long member 1 by the third apparatus can be raised largely.

In the above-mentioned explanation, all the total of four corner parts of the two first corner parts 5 and the two second corner parts 6 are the target corner parts of the hardening treatment by the third apparatus. However, a part of the four corner parts can also be the target corner part by making only a part of the two hardening means 110a and the two hardening means 110b to operate. In accordance with this, the hardening treatment on all or a part of the four corner parts can be divided into multiple times and can be performed sequentially.

Figure 14:
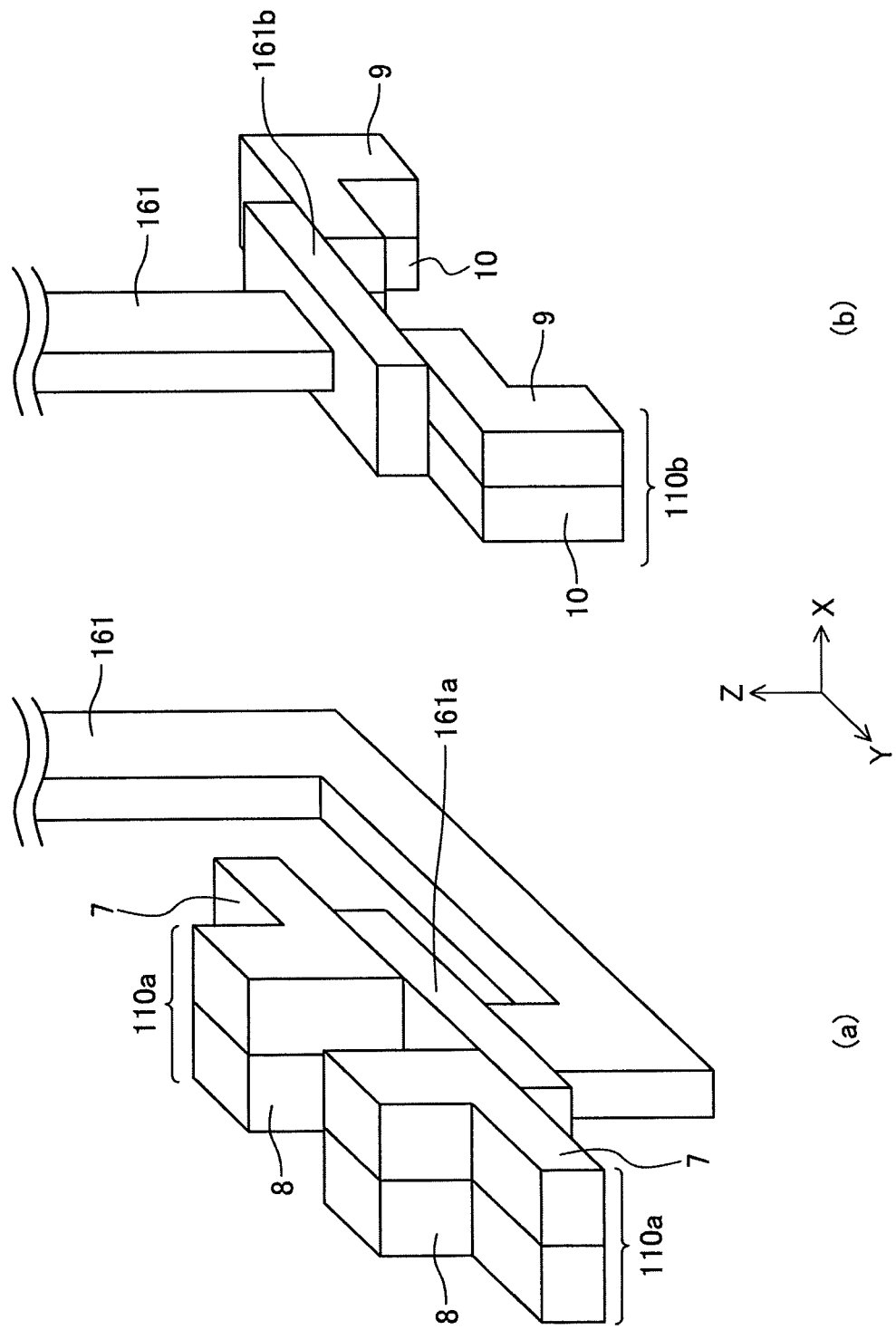
FIG. 14 is a schematic perspective view for exemplifying another configuration of a hardening means which the third apparatus may comprise.

Furthermore, as shown in (a) of FIG. 14, for example, the hardening means 110a which can perform the hardening treatment on the two first corner parts 5 can be fixed to the arm 161, and the hardening treatment can be performed only to either one or both of the two first corner parts 5. Similarly, as shown in (b) of FIG. 14, for example, the hardening means 110b which can perform the hardening treatment on the two second corner parts 6 can be fixed to the arm 161, and the hardening treatment can be performed only on either one or both of the two second corner parts 6. Moreover, these hardening treatments can be combined, and the hardening treatment on all or a part of the four corner parts can be divided into multiple times and can be performed sequentially.

In addition, in the hardening means 110 shown in FIG. 14, the two hardening means 110a and 110b are disposed on both of the near side (positive direction side of the Y-axis) and the back side (negative direction side of the Y-axis), respectively. However, only either one of these two hardening means 110a and 110b may be disposed to configure the hardening means 110 so as to be able to perform the hardening treatment individually only on one corner among the four corner parts. In accordance with this, even when the width (dimension in the Y-axis direction) of the top plate part 2 is not constant, the hardening treatment can be performed individually on each corner part, for example.

Furthermore, in the hardening means 110 shown in FIG. 14, the two hardening means 110a and 110b are respectively fixed to the connection members 161a and 161b at a constant interval. However, by attaching the two hardening means 110a and 110b to the connection members 161a and 161b so as to be able to move independently in the Y-axis direction respectively, attaching the rollers 193a and 193b, which the guide part 190 comprises, to the holding member 191 so as to be able to move independently in the Y-axis direction respectively, and further preparing individual tracing means 160 for each of pairs of the corresponding hardening means and the above-mentioned rollers, it is possible to configure such that the hardening treatment can be simultaneously performed on the two first corner parts 5 and the two second corner parts 6 even when the width of the top plate part 2 is not constant.

Fourth Embodiment

Hereafter, an example of the hardening apparatus according to another embodiment of the above-mentioned second present-invention apparatus (which may be referred to as a "fourth apparatus" hereafter) will be explained detail, referring to drawings. In the present example, a case where a curve of the long member 1 is three-dimensional will be explained.
<Configuration>

Basically, the fourth apparatus has the same configuration as that of the third apparatus except for a point that it has a mechanism which enables tracing in the Z-axis direction since the curve of the bent pipe is three-dimensional as mentioned above. Therefore, in the following explanation, a configuration which is different from that of the third apparatus will be explained in detail, and an explanation about the same configuration as that of the third apparatus may be omitted.

First, since the long member 1 as a workpiece which is a target of the hardening treatment by the fourth apparatus has a three-dimensional curve, the long member 1 itself is adopted as the tracing gauge and supported and fixed at its both ends with holders (151 and 152), unlike the tabular tracing gauge 150 which is specialized in the two-dimensional curve and used in the first apparatus (and the third apparatus).

The tracing means in the fourth apparatus needs to be able to move also in the Z-axis direction, and has the same configuration as the tracing means 160 in the above-mentioned second apparatus 200. Namely, the tracing means in the fourth apparatus can move in all the directions of the X-axis, the Y-axis, and the Z-axis.

Furthermore, the guide part of the fourth apparatus also needs to be configured so as to be able to accurately trace a three-dimensional change of the shape, and it is desirable that the guide part 190 is configured to contact with the tracing gauge 150 from at least 3 directions. Specifically, the guide part 190 of the fourth apparatus is constituted by the rollers 193a, 193b, and 193c rotatably attached to the axis 192a, 192b, and 192c prepared on the stay 194a, 194b, and 194c attached to the holding member 191, as shown in (a) of FIG. 15. Furthermore, the guide part 190 is energized downward (toward the negative direction of the Z-axis) by an energizing means which is not shown. Thereby, the guide part 190 can accurately trace even a curve in the Z-axis direction of the long member 1.

In addition, when the hardening treatment is performed in a state where the back side of the long member 1 (namely, a side opposite to the top plate part 2 of the hat-like cross-section) faces to the upper side (positive direction side of the Z-axis), the guide part 190 may be configured such that the above-mentioned rollers 193a, 193b, and 193c may be contacted with the tracing gauge 150 from the back side (inner side) of the hat-like cross-section, as shown in (b) of FIG. 15, for example. Also in this case, the guide part 190 can accurately trace even a curve in the Z-axis direction of the long member 1 by being energized downward (toward the negative direction of the Z-axis) by an energizing means which is not shown.

In addition, as for any of the exemplifications in (a) and (b) of FIG. 15, a fourth roller which opposes (faces) the roller 193c may be added, instead of preparing an energizing means as mentioned above, to configure such that a curve in the Z-axis direction of the long member 1 is traced accurately.
<Operation>

Since an operation of the fourth apparatus in the hardening treatment is basically the same as the operation of the first apparatus 100 (and third apparatus), an explanation is omitted here.
<Effects>

As mentioned above, in accordance with the fourth apparatus, it is possible to control strictly the spatial relationship between the long member 1 and the heating means 110 by a simple mechanical means even when the long member 1 has a three-dimensional curve. Furthermore, a changeover can be easily performed by exchanging the tracing gauge 150 with that corresponding to a new workpiece. In addition, since such a simple mechanical means is used, the fourth apparatus can attain low cost and space-saving simultaneously, as compared with a case where an industrial robot is used.
<Supplement>

In the hardening means 110 shown in FIG. 13, the hardening means 110a on the back side and the hardening means 110b on the front side of the long member 1 are respectively fixed to the connection member 161c through the connection members 161a and 161b at a constant interval. However, by attaching the hardening means 110a on the back side and the hardening means 110b on the front side to the connection member 161c so as to be able to move independently in the Z-axis direction respectively, attaching rollers, which can trace positions of the first corner part 5 and the second corner part 6 in the Z-axis direction, to the holding member 191 so as to be able to move independently in the Z-axis direction respectively, and further preparing individual tracing means 160 for each of pairs of the corresponding hardening means and the above-mentioned rollers, it is possible to configure such that the hardening treatment can be simultaneously performed on the two first corner parts 5 and the two second corner parts 6 even when the height (dimension in the Z-axis direction) of the sidewall parts 3 is not constant.

Fifth Embodiment

Hereafter, an example of the hardening method according to one embodiment of the above-mentioned second present-invention method (which may be referred to as a "second method" hereafter) will be explained detail, referring to drawings.
<Configuration>
The second method is a hardening method for a long member, in which any one of the hardening apparatuses for a long member having a hat-like cross-section, according to the present invention (second present-invention apparatus) including the above-mentioned third apparatus and the fourth apparatus is used to perform the hardening treatment on the long member 1. Therefore, the second method includes a hardening process in which the hardening treatment is performed on the target corner part by heating the target corner part with the heating means and thereafter cooling the target corner part with the cooling means while relatively moving the long member 1 and the hardening means 110 in the longitudinal direction by relatively moving the long member 1 and the tracing means with the transportation means.

In the second method, the target corner part includes both the two first corner parts 5 and the two second corner parts 6. And, the above-mentioned hardening process includes the first step, in which the hardening treatment is performed on the two first corner parts, and the second step, in which the hardening treatment is performed on the two second corner parts. Since the details about the hardening treatment in the first step and the second step have been already mentioned in the explanation about the second present-invention apparatus, an explanation is omitted here.

In addition, as mentioned above, the first step and the second step in the hardening process may be performed simultaneously, or may be performed sequentially. When performing sequentially the first step and the second step, it is desirable to perform the second step after performing the first step in the hardening process. Namely, it is desirable to perform the hardening treatment on the corner parts on the front side (second corner parts 6) after the corner parts on the back side (the first corner parts 5) of the long member 1 having a hat-like cross-section. Therefore, in the second method, the second step is performed after performing the first step in the hardening process.

In addition, in the present example, the long member 1 is fixed in a predetermined attitude, and the hardening means 110 is moved. Moreover, in the present example, the hardening apparatus configured such that the hardening means 110a opposing (facing) the two first corner parts 5 located on the back side of the long member 1 and the hardening means 110b opposing the two second corner parts 6 located on the front side of the long member 1 can be individually moved respectively is used.

Figure 16:
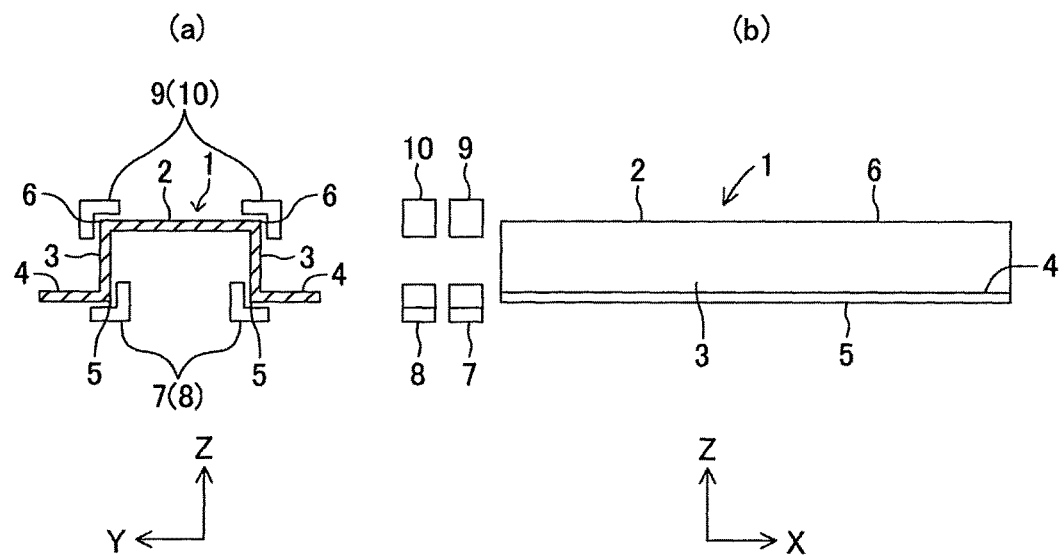
FIG. 16 is (a) a schematic side view and (b) a front view for showing a layout of a long member and a hardening means before a startup of an example of a hardening method according to one embodiment of the second present-invention method (second method).

First, as shown in (b) of FIG. 16, the long member 1 is fixed in a predetermined attitude by jigs (tools) which are not shown (for example, the chucks 121 and 122), and the hardening means 110a (the heating means 7 and the cooling means 8) and the hardening means 110b (the heating means 9 and the cooling means 10) are made to stand by at an end on the negative direction side of the X-axis. Since the respective hardening means move to the positive direction side of the X-axis thereafter, the heating means 7 and the heating means 9 are arranged at the front side (positive direction side of the X-axis) of the cooling means 8 and the cooling means 10, respectively.

Figure 17:
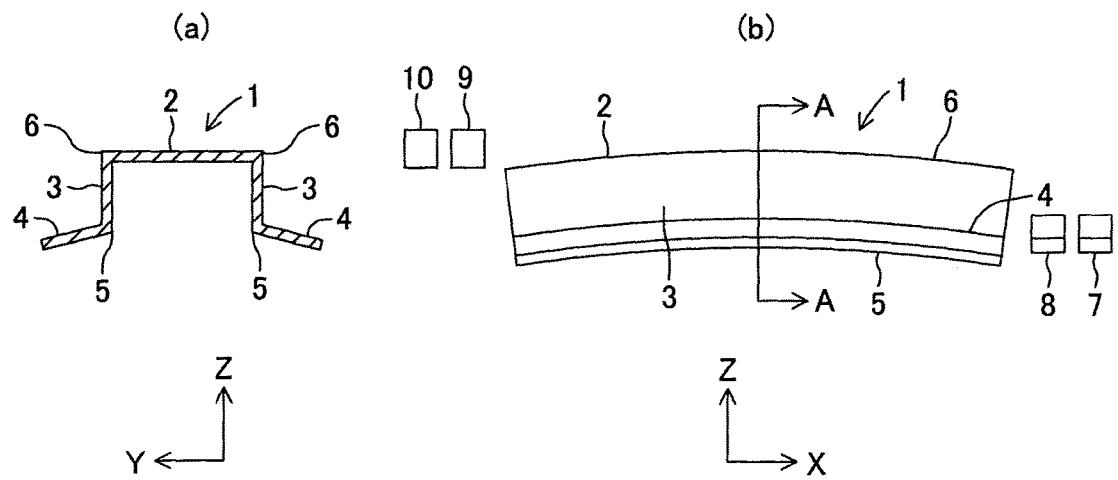
FIG. 17 is (a) a schematic sectional view taken along a line A-A and (b) a schematic front view for showing a layout of the long member and the hardening means after execution of a first step included in the second method.

Next, as shown in (b) of FIG. 17, the hardening treatment is performed on the entire length of the two first corner parts 5 of the long member 1 by moving the hardening means 110a (the heating means 7 and the cooling means 8) to the positive direction of the X-axis while operating the hardening means 110a. Namely, the first step is performed. As a result, distortion (warp) of the axis of the long member 1 in the longitudinal direction is generated such that the front side (positive direction side of the Z-axis) of the long member 1 becomes convex, and outer end parts (ends of a side opposite to the sidewall parts 3) of the flanges 4 inclined below (toward the negative direction of the Z-axis).

Figure 18:
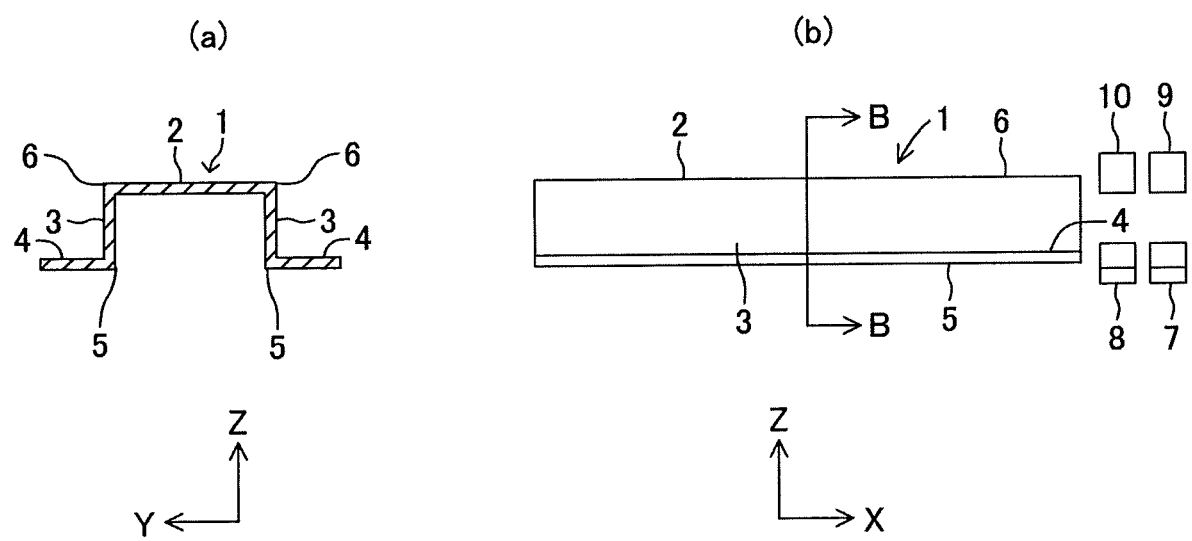
FIG. 18 is (a) a schematic sectional view taken along a line B-B and (b) a schematic front view for showing a layout of the long member and the hardening means after execution of a second step included in the second method.

Next, as shown in (b) of FIG. 18, the hardening treatment is performed on the entire length of the two second corner parts 6 of the long member 1 by moving the hardening means 110b (the heating means 9 and the cooling means 10) to the positive direction of the X-axis, while operating the hardening means 110b. Namely, the second step is performed. As a result, distortion (warp) to a direction opposite to that of the distortion (warp) generated in the first step is generated. Thereby, the distortion (warp) generated in the first step is offset and the long member 1 is restored to its original shape without any distortion (warp).
<Effects>
As mentioned above, in accordance with the second method, even when distortion (warp) is generated in the axis of the longitudinal direction of the long member 1 by the hardening processing on the two first corner parts 5 in the first step such that the front side (namely, the top plate side in the hat-like cross-section) becomes convex, distortion (warp) in a direction opposite to the distortion (warp) generated in the first step is generated by the hardening processing on the two second corner parts 6 in the following second step. As a result, the distortion (warp) generated in the first step is at least partially offset by the distortion (warp) generated in the second step, and the distortion (warp) of the axis of the long member 1 in the longitudinal direction is reduced.
<Supplement>
As mentioned above, in the second method, the execution of the second step is started after the execution of the first step is completed. However, as long as the second step is performed after the first step in each position of the corner parts in the longitudinal direction (the X-axis direction) of the long member 1, the execution of the second step may be started before the completion of the first step. In this case, as the whole hardening method, the second step comes to be started in the middle of the execution of the first step. Specifically, for example, in the above-mentioned second method, the hardening means 110b is moved later than the hardening means 110a by a predetermined distance (predetermined time period). Thereby, the second step can be started during the execution of the first step as the whole hardening method, while the second step can be started after the first step at each point of the target corner part.

By the way, as mentioned above, the distortion (warp) may occur in the axis in the longitudinal direction of the long member 1 such that the front side thereof becomes convex by the hardening treatment on the two first corner parts 5 in the first step. As mentioned above, when such distortion (warp) is large, it may become difficult to use the long member 1 as a constituent member of a vehicle, for example.

However, the distortion (warp) generated in the first step is generally small, and is not large enough for obstructing the hardening treatment in the hardening apparatus using the tracing gauge as mentioned above. Specifically, the spacing between the long member 1 as a workpiece and the hardening means 110 is comparatively large (about 3 to 5 mm), while the size of the distortion (warp) generated in the first step is about ±0.5 mm. Therefore, even when the distortion (warp) as mentioned above is generated in the first step, a possibility that the long member 1 and the hardening means 110 may interfere during the execution of the hardening treatment.

Furthermore, uneven heating resulting from the above-mentioned distortion (warp), etc., can be reduced by adjusting power supply to an induction-heating coil as the heating means and the velocity of the long member 1 and the hardening means 110 moving relatively in the longitudinal direction, etc., for example.

Sixth Embodiment

By the way, in all of the various embodiments of the present invention, which have been explained so far, it is supposed that the spatial relationship between the workpiece and the hardening means (especially, heating means) is strictly controlled by holding the hardening means at the tracing means which can move along the shape of the tracing gauge which has a shape substantially identical to the long member as a workpiece.

However, the effect of reducing the distortion (warp) of the axis of the long member in the longitudinal direction after the hardening treatment by performing the hardening treatment not only on the corner part on the front side (top plate side), but also on the corner part on the back side of the long member having a hat-like cross-section as mentioned above can be attained irrespective of the with or without of control of the spatial relationship between the long member and the hardening means using the tracing gauge.

For example, it is also possible to reduce the distortion (warp) of the axis of the long member in the longitudinal direction after the hardening treatment by performing the hardening treatment on the two first corner parts located on the back side and the two second corner parts located on the front side of the long member while making a multi-axis robot (articulated industrial robot) etc. hold one or both of the long member and the hardening means and making the robot control the spatial relationship between the long member and the hardening means.

When performing the hardening treatment on the long member having a hat-like cross-section using an industrial robot, etc. as mentioned above, the hardening treatment can be accurately performed on the target corner part, flexibly correspond to even a long member with the width of its top plate part and/or the height of its wall part not constant.

Although some the embodiments and modifications having specific configurations have been explained sometimes referring to the accompanying drawings as mentioned above, for the purpose of explaining the present invention, It should not be interpreted that the scope of the present invention is limited to these exemplary embodiments and modifications, and it is needless to say that any correction can be suitably added within the limits of the matters described in the claims and the specification.

REFERENCE SIGNS LIST 100 and 200: Hardening Apparatus, 101 and 102: Base, 110, 110a and 110b: Hardening Means, 111: Heating Means, 112 and 113: Cooling Means, 120: Bent Pipe, 121 and 122: Chuck, 130: Transportation Means, 131: Servomotor, 132: Ball Screw, 133: Guide Rail, 140: Control Means, 150: Tracing Gauge, 151 and 152: Holder, 153: Stand, 160: Tracing Means, 161 and 168: Arm, 161a, 161b, and 161c: Connection Member, 163 and 165, and 165': Base, 164 and 164': Guide Rail, 166: Slider, 167: Pantograph, 170: Frame, 171 and 172: Guide Rail, 173: Base, 174: Pulley, 175: Wire, 176: Weight, 181 to 184: Support Member, 191: Holding Member, 192a, 192b and 192c: Axis, 193a, 193b and 193c: Roller, 194a, 194b and 194c: Stay, 1: Long Member having a hat-like cross-section, 2: Top Plate Part, 3: Sidewall Part, 4: Flange Part, 5: First Corner Part, 6: Second Corner Part, 7 and 9: Heating Means, and 8 and 10: Cooling Means.

The invention claimed is:
1. A hardening apparatus for a bent pipe, comprising:
 a hardening means including a heating means and a cooling means, a transportation means to relatively move a bent pipe as a workpiece and said hardening means,
 a tracing gauge which is a member having an axis shape identical to an axis shape of said bent pipe and being held in an attitude identical to an attitude of said bent pipe,
 a tracing means which is a configured so as to be able to move relatively to said bent pipe and said tracing gauge, not only in the longitudinal direction of said bent pipe and said tracing gauge, but also in the direction perpendicular to said longitudinal direction; and
 a guide part engaged with said tracing gauge in a manner slidable along said tracing gauge is held at one end of said tracing means, wherein:
 said hardening means is held at the other end of said tracing means, and
 said transportation means relatively moves said bent pipe and said hardening means in said longitudinal direction by relatively moving said bent pipe and said tracing means.
2. The hardening apparatus according to claim 1, further comprising:
 a plurality of support members which can support said bent pipe from below and can be evacuated below, wherein
 said plurality of said support members are arranged at a vacate a spacing, and are arranged apart from each other along said longitudinal direction of said bent pipe.
3. The hardening apparatus according to claim 2, wherein:
 each of said plurality of said support members is configured so as to be evacuated below when said hardening means is within a predetermined distance and to sup- port said bent pipe from below when said hardening means is not within the predetermined distance.

4. The hardening apparatus according to claim 1, wherein: said hardening means comprises said cooling means on both sides of said heating means in said longitudinal direction, respectively.

5. A hardening apparatus for a long member, comprising:
a hardening means including a heating means and a cooling means, and
a transportation means to relatively move a long member and said hardening means in the longitudinal direction of said long member, said long member has a hat-shaped cross-section which consists of a top plate part, two sidewall parts respectively extending toward the same direction from both ends of said top plate part on the same one of two principal surfaces of said top plate part and two flange parts respectively extending toward the opposite sides of the top plate part across the sidewall parts from the ends of said two sidewall parts on an opposite side of said top plate part, wherein:
said hardening means is arranged so as to oppose a target corner part that is at least one corner part among two first corner parts which are two corner parts, at which said flange parts and said sidewall parts intersect, and two second corner parts which are two corner parts, at which said sidewall parts and said top plate part intersect, at a predetermined spacing, and
said hardening apparatus further comprises:
a tracing gauge which is a member having a shape corresponding to a ridge line shape consisting of said target corner part of said long member and being held in an attitude identical to an attitude of the said long member,
a tracing means which is a configured so as to be able to move relatively to said long member and said tracing gauge, not only in the longitudinal direction of said long member and said tracing gauge, but also in the direction perpendicular to said longitudinal direction;
a guide part engaged with said tracing gauge in a manner slidable along said tracing gauge is held at one end of said tracing means,
said hardening means is held at the other end of said tracing means, and
said transportation means relatively moves said long member and said hardening means in said longitudinal direction by relatively moving said long member and said tracing means.

6. The hardening apparatus according to claim 5, wherein:
hardening surfaces of said heating means and said cooling means, which are surfaces opposing said target corner part, have a shape along a hardening target surface of said target corner part, which is a surface opposing said heating means and said cooling means.

7. A hardening method for a long member for performing a hardening treatment on said long member using the hardening apparatus according to claim 5, including:
a hardening process in which the hardening treatment is performed on said target corner part by heating said target corner part by said heating means and thereafter cooling said target corner part by said cooling means while relatively moving said long member and said hardening means in said longitudinal direction by relatively moving said long member and said tracing means through said transportation means.

8. The hardening method according to claim 7, wherein:
said target corner part contains both said two first corner parts and said two second corner parts,
said tempering process includes;
a first step in which the hardening treatment is performed on said two first target corner parts by heating said two first target corner parts by said heating means and thereafter cooling said two first target corner parts by said cooling means while relatively moving said long member and said hardening means in said longitudinal direction by relatively moving said long member and said tracing means through said transportation means, and
a second step in which the hardening treatment is performed on said two second target corner parts by heating said two second target corner parts by said heating means and thereafter cooling said two second target corner parts by said cooling means while relatively moving said long member and said hardening means in said longitudinal direction by relatively moving said long member and said tracing means through said transportation means.

9. The hardening method according to claim 8, wherein:
said second step is performed after said first step is performed, in said hardening process.

* * * * *